(12) United States Patent
Abramovitch

(10) Patent No.: US 6,745,148 B2
(45) Date of Patent: Jun. 1, 2004

(54) INTELLIGENT TEST POINT SELECTION FOR BIT ERROR RATE TESTER-BASED DIAGRAMS

(75) Inventor: Daniel Yves Abramovitch, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 61 days.

(21) Appl. No.: 10/162,405

(22) Filed: Jun. 3, 2002

(65) Prior Publication Data

US 2003/0225541 A1 Dec. 4, 2003

(51) Int. Cl.[7] .............................................. G06M 11/04

(52) U.S. Cl. ........................................ 702/127; 702/65

(58) Field of Search ..................... 702/127, 65, 100, 702/104; 360/48; 714/704; 355/68, 55; 364/188; 705/7; 382/109; 395/155; 600/558; 375/342, 234

(56) References Cited

U.S. PATENT DOCUMENTS 6,023,384 A * 2/2000 Anderson et al. .............. 360/48
2003/0097226 A1 * 5/2003 Waschura et al. ............. 702/65

OTHER PUBLICATIONS

Hiroshi Nishimoto et al.; "New Method of Analyzing Eye Patterns and Its Application to High–Speed Optical Transmission Systems"; IEEE Journal of Lighwave Technology. vol. 6, No. 5; May 1988; pp. 678–685.

Takashi Touge, et al.; "Key Technology For Multi–Gigabit Optical Transmission Systems"; Proceedings of IEEE International Conference on Communications; 1988; pp. 301–307.

H. Nishimoto et al.; "Modulation Schemes For Multi–Gigabit Optical Transmission Systems"; IEEE 1988; pp. 487–491.

Andrew W. Fitzgibbon et al.; "*Direct Least Squares Fitting of Ellipses*"; Department of Artificial Intelligence The University of Edinburgh, Scotland; Jan. 4, 1996; pp. 1–15.

Andrew Fitzgibbon et al.; "*Direct Least Square Fitting of Ellipses*"; IEEE Transactions on Pattern Analysis and Machine Intelligence, vol. 21, No. 5; May 1999; pp. 476–480.

Andrew Fitzgibbon et al.; "*Direct Least Square Fitting of Ellipses*"; Department of Artificial Intelligence, The University of Edinburgh, Scotland; 1996; 5 pages.

Maurizio Pilu et al.; "*Ellipse–specific Direct Least–Square Fitting*"; Proceedings of the IEEE International Conference on Image Processing (Lausanne), Sep. 1996; pp. 599–602.

Microwave Product Digest; "*Application Note*"; Jan. 2000, 2 pages; Internet: www.mpdigest.com.

(List continued on next page.)

*Primary Examiner*—John Barlow
*Assistant Examiner*—Xiuqin Sun

(57) ABSTRACT

Method and apparatus for constructing diagrams representing the relationship between variable quantities. According to the method, at least one first measurement point representing the relationship between the variable quantities is provided for initially constructing the diagram. Thereafter, at least one location is selected at which the relationship between the variable quantities is to be measured, the at least one location being selected as a function of the at least one measurement point. The relationship between the variable quantities is then measured at the at least one location to provide at least one additional measurement point for further constructing the diagram. The invention permits diagrams, such as V Curve diagrams, Bathtub Curve diagrams and Eye Diagrams, to be constructed in less time and using fewer measurement points than conventional diagram construction procedures.

41 Claims, 16 Drawing Sheets

OTHER PUBLICATIONS

Agilent Technologies; "*Improve Productivity with Automated Q–factor and Eye–Contour Testing*"; Jul. 18, 2001 (UK); pp. 1–4.

Agilent Technologies; "*Agilent E4874A Characerization Software Components for the Agilent 81200 Data Generator/Analyzer Platform*"; May 8, 2001 (Germany); pp. 1–4.

Tektronix; "*3.6 GHz Bit Error Rate Tester*"; 2002; 11 pages.

SyntheSys; "*BitAlyzer®1500 Bit Error Rate Analyzer*"; 2002; 4 pages.

D. Derickson, Editor; "*Fiber Optic Test and Measurement*"; Chapter 8; ©1998; pp. 30 (284–339).

* cited by examiner

INTELLIGENT TEST POINT SELECTION FOR BIT ERROR RATE TESTER-BASED DIAGRAMS

BACKGROUND OF THE INVENTION

1. Technical Field of the Invention

The present invention relates generally to the construction of diagrams representing the relationship between variable quantities; and, more particularly, to a method and apparatus for constructing diagrams representing the relationship between the bit error rate of a digital signal and one or more other variable quantities.

2. Description of Related Art

In communications systems, a number of factors can contribute to a degradation in the quality of a transmitted signal. For example, the quality of a signal can be degraded as a result of one or more of mechanisms for modulating the signal, transmitting the signal and detecting the signal. By evaluating signal degradation in a communications system, the performance of a particular system can be verified and information obtained from the evaluation can be utilized in the development of new systems.

Bit Error Rate Testers (BERTs) are often used to evaluate the performance of digital communications systems (see D. Derickson ed., *Fiber Optic Test and Measurement*, Hewlett-Packard Professional Books, Upper Saddle River, N.J., 07458, Prentice Hall PTR, 1998). A bit error rate tester measures bit error rate (BER) for a given setting of control variables associated with a Device Under Test (DUT). By plotting the BER versus different values of a particular control variable, a user is able to establish the margins of that variable for a given BER.

Exemplary measurement procedures result in diagrams referred to as "V Curves", "Bathtub Curves" and "Eye Diagrams". To construct a V Curve, the user varies a threshold voltage while keeping other variables constant. To construct a Bathtub Curve, the user varies the bit timing while keeping other variables constant. To construct an Eye Diagram, some representation of the BER is plotted versus a pair of control variables. For example, offset time can be plotted along the x-axis and threshold voltage can be plotted along the y-axis. The BER at the plotted points can then be represented in various ways such as by a color map, a contour plot or some three-dimensional representation.

SUMMARY OF THE INVENTION

Embodiments in accordance with invention provide a method and apparatus for constructing a diagram representing a relationship between variable quantities that enables the diagram to be accurately constructed with a limited number of measurement points and in a reduced period of time.

A method for constructing a diagram representing a relationship between variable quantities according to the present invention comprises providing at least one first measurement point at which a relationship between variable quantities is measured for initially constructing the diagram. Thereafter, at least one location is selected at which the relationship between the variable quantities is to be measured, the at least one location being selected as a function of the at least one first measurement point. The relationship between the variable quantities is then measured at the at least one location to provide at least one additional measurement point for further constructing the diagram.

It has been discovered that by intelligently selecting locations at which the relationship between variable quantities are to be measured, a diagram that accurately represents the relationship between the variable quantities can be efficiently constructed. Intelligent selection of the measurement points may, for example, permit a reduction in the number of measurement points required to accurately construct the diagram, and may permit the diagram to be constructed in less time than by conventional diagram construction procedures.

Furthermore, the invention provides embodiments with other features and advantages in addition to or in lieu of those discussed above. Many of these features and advantages are apparent from the description below with reference to the following drawings.

DETAILED DESCRIPTION OF THE EXEMPLARY EMBODIMENTS OF THE INVENTION

Figure 1:
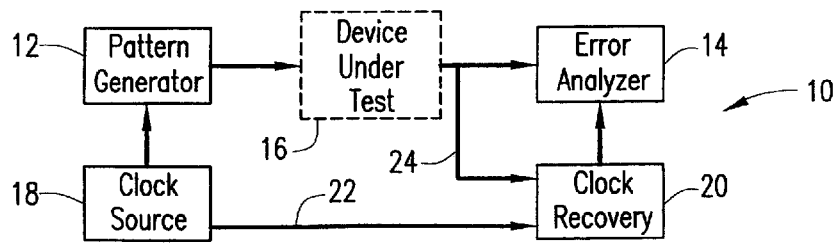
FIG. 1 is a block diagram that schematically illustrates a bit error rate tester.

Embodiments in accordance with the present invention provide a method and apparatus for constructing diagrams representing the relationship between variable quantities by which accurate diagrams can be constructed in a reduced amount of time using a limited number of measurement points as compared to conventional diagram construction procedures.

Prior to presenting the detailed description, it will be useful to define several terms that are utilized herein to facilitate a clear understanding of the present invention.

BER: Bit Error Rate/Bit Error Ratio. Essentially, a measure of the number of received bits in error divided by the total number of received bits.

Eye Diagram/Eye Map/Eye Contour: A three-dimensional map of bit error ratio/rate values versus two control variables. Traditional Eye Diagrams are made using oscilloscopes. On digital oscilloscopes, a two-dimensional plot is generated by triggering the scope to the data (or a clock derived from the data) and using the extended persistence features. When the scope trace passes through a particular pixel, a count is incremented in a "pixel database". The third dimension is generated by using false color on the pixels to show the frequency of occurrence of a certain pixel. The distribution of pixels from the data curves typically resembles an eye and the amount of open space in the eye gives an estimate of the bit error ratio. For the purpose of this application, "Eye Diagrams" are produced by a BER tester that measures BER for various values of two control variables. The BER measurements are then plotted on a two-dimensional grid. The third dimension can be represented by a three-dimensional surface representation, by a false color map on a two-dimensional grid, or by a contour map on a two-dimensional grid. These are also sometimes referred to as "Eye Maps" or "Eye Contours".

Filtering: A method of removing certain components from the data, generally related to some frequency. Relatively common are low-pass, high pass and band-pass filtering. These allow low frequency, high frequency, and data in a specified frequency, respectively, to pass through. Filtering of sampled data takes place by making some combination of the data with previous data values. That is to say that filtering makes use of causal data only. This combination is often linear.

Smoothing: Similar to filtering, except that smoothing takes into account both causal and anti-causal data. That is to say, smoothing a data sample at time $t_k$, can make use of samples at times before $t_k$ and after $t_k$.

Surface: For the purpose of this application, a surface refers to a function of two (or possibly more) variables. The plot of a surface is a 3-dimensional diagram. In the following description, two input variables are most likely threshold voltage offset and time offset. The output of the function, i. e., the surface value at that point, is the Bit Error Rate.

Curve fit: For the purpose of this document, a curve fit is the process in which the parameters of an analytic function are adjusted so as to minimize the distance between a set of points and points generated by the analytic function.

$\|\cdot\|^p$: This is the p-norm, a form of distance measurement. For a vector of length n e.g., $u=[u_1 u_2 \ldots u_n]'$ the p-norm is calculated as $$\|u\|^p = \sqrt[p]{\sum_{i=1}^{n} |u_i|^p}.$$

In the case where p=1, the p-norm corresponds to the sum of the absolute values of the vector elements. In the case where p=2, the p-norm corresponds to the product of a vector with it's complex conjugate transposed (in the case of complex numbers) and is used for calculating the Euclidean distance. In the case where p=∞, the p-norm selects the single element with the largest absolute value.

Raster: For the purpose of this application, a raster is a sequential sweep of a rectangular area in uniformly spaced steps. A raster method of generating measurement points results in a uniform grid of measurement points over some (typically) rectangular area.

Bit Error Rate Testers (BERTs) are often used to evaluate the performance of digital communications systems. FIG. 1 is a block diagram that schematically illustrates a bit error rate tester in a substantially simplified form. The tester is generally designated by reference number 10 and includes pattern generator 12 and error analyzer 14 connected together through Device Under Test (DUT) 16. The DUT may, for example, be one or more components of a digital communications system, such as a digital optical transmission system. Pattern generator 12 generates a predetermined data pattern for input to the DUT. Error analyzer 14 receives the data pattern from the DUT, compares the received data pattern to the predetermined data pattern and measures the bit error ratio (BER), often referred to herein and in the art as the "bit error rate".

Pattern generator 12 includes clock source 18 that triggers the generation of data. To conduct bit error rate testing, error analyzer 14 is clocked at the same rate as the data stream from the pattern generator. Clocking of error analyzer 14 is represented in FIG. 1 by clock recovery 20, and is accomplished either by triggering error analyzer 14 from clock source 18 that triggers pattern generator 12, as indicated by line 22; or by operating the error analyzer from a clock that has been recovered from the data, as represented by line 24. The clocking choice depends on the particular application and on the proximity of error analyzer 14 to pattern generator 12. Bit error rate tests may be performed even when the error analyzer is physically separated from the pattern generator by a large distance, e. g., by hundreds or even thousands of miles. In such a situation, recovering the clock from the data is the more likely choice. When the pattern generator and the error analyzer are located close to one another, the pattern generator and the error analyzer can be fed by the same clock source.

In a bit error rate tester such as illustrated in FIG. 1, the data pattern sent from pattern generator 12 to DUT 16 is a known pattern. The most common types of patterns include a Pseudo Random Bit Sequence (PRBS), a Pseudo Random Word Sequence (PRWS) and memory-based patterns. Memory-based patterns are patterns that are loaded into memory before the test is conducted so as to be read out sequentially during the test.

Bit error rate tester 10 measures the BER for a given setting of control variables associated with the DUT, for example, voltage and timing. Once the ability to measure BER for a given setting of control variables has been established, a user often wants to measure the margins for error with the DUT. To do this, the user varies one or more of the control variables and measures the BER at each setting. By plotting the BER versus different values of a particular control variable, for example, the user is able to establish the margins of that variable for a given BER.

Figure 2:
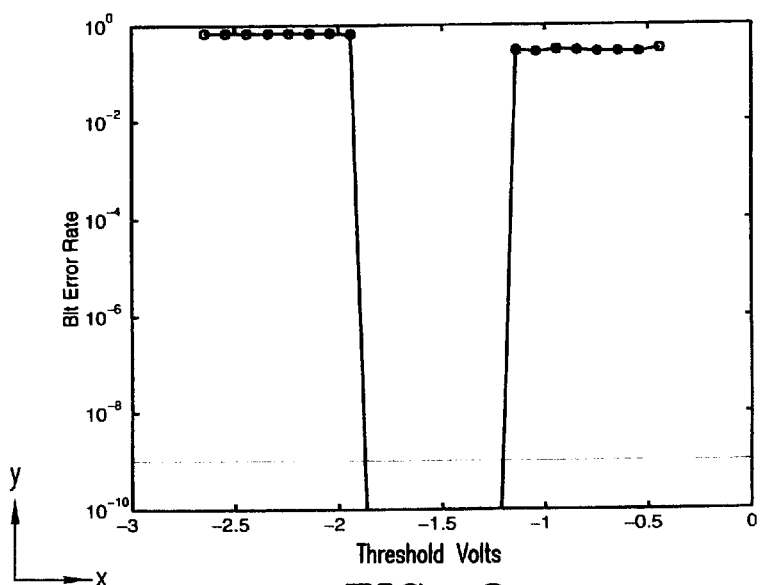
FIGS. 2 and 3 illustrate exemplary V Curve diagrams representing the relationship between bit error rate of a digital signal from a device under test and threshold voltage to assist in explaining the present invention.
Figure 3:
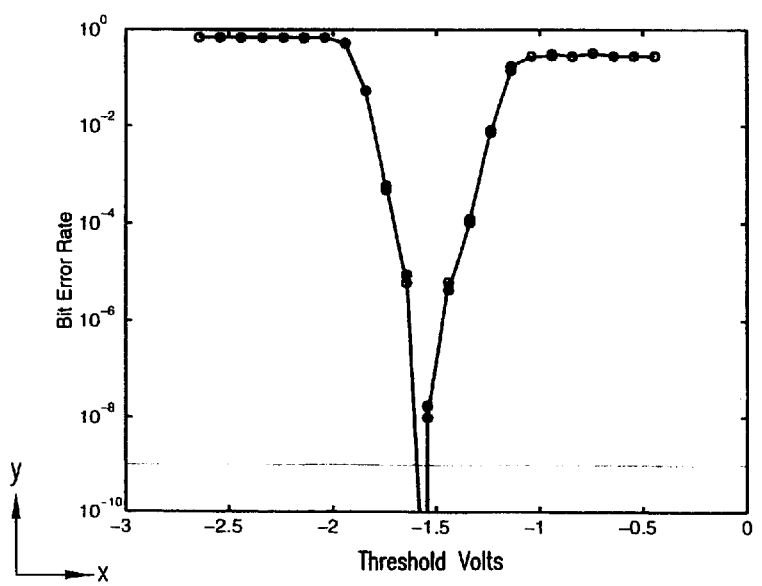

One exemplary measurement procedure results in a diagram referred to as a "V Curve". In this measurement procedure, the user varies only a threshold voltage while keeping other variables constant. The plotting of measurements of BER versus the threshold voltage typically forms a curve resembling a "V", sometimes with the tip of the V missing to form a truncated V. If the threshold voltage is plotted along the x-axis and the BER along the y-axis, the user can find an acceptable BER level and then scan horizontally across the diagram to find the voltage margin at that BER. FIG. 2 illustrates exemplary V Curve diagram 30 constructed using a limited number of measurement points with measurements made on hardware with a very low noise floor. FIG. 3 illustrates exemplary V Curve diagram 35 constructed using a greater number of measurement points with measurements made on hardware with a raised noise floor. It is to be noted that the opening of the V in the curve of FIG. 3 is substantially narrowed relative to the opening of the V in the curve of FIG. 2.

Figure 4:
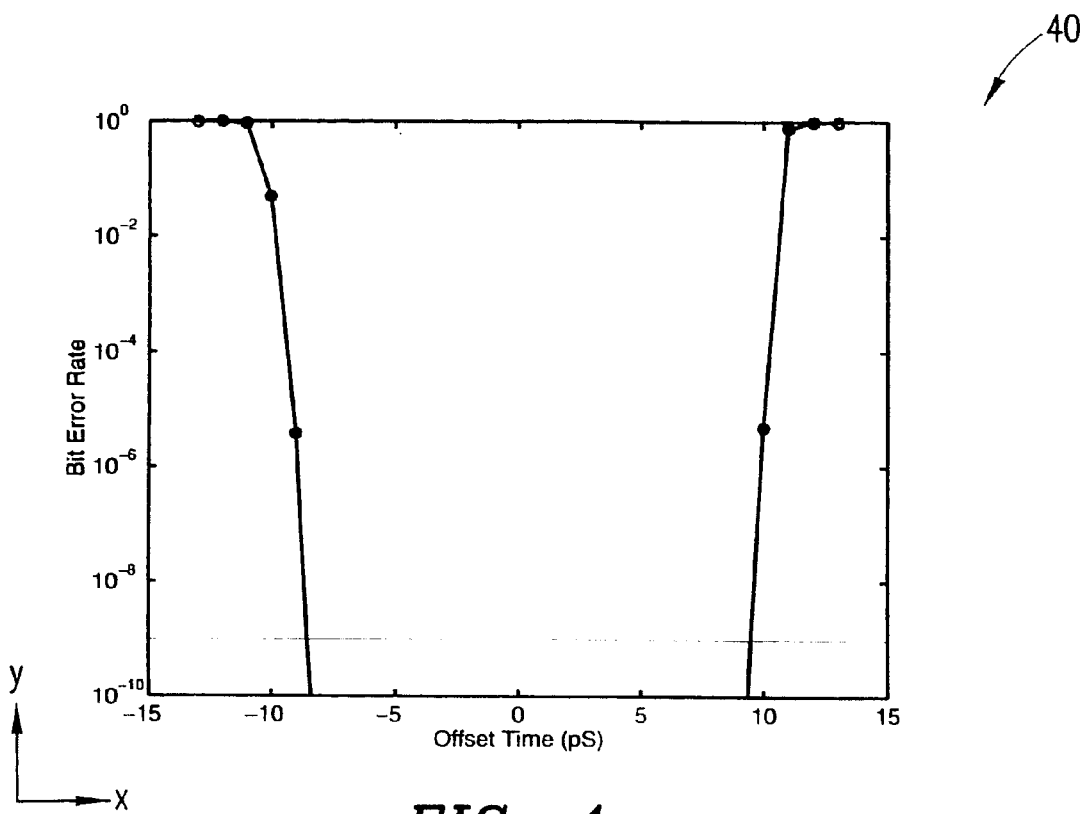
FIGS. 4 and 5 illustrate exemplary Bathtub Curve diagrams representing the relationship between bit error rate of a digital signal from a device under test and offset time to assist in explaining the present invention.
Figure 5:
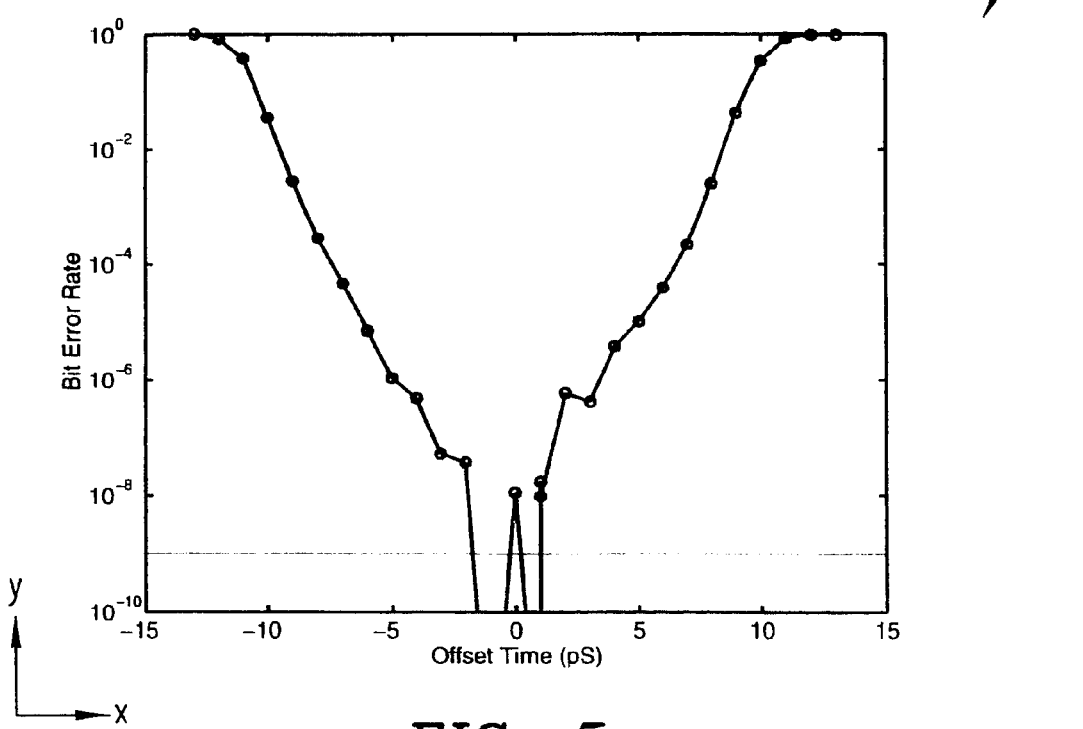

Another type of measurement procedure results in a diagram known as a "Bathtub Curve". In this measurement procedure, the user varies only the bit timing while keeping all other variables constant. The measurements of the BER versus offset time typically forms a curve somewhat resembling the profile of a bathtub, and may also be truncated. If the offset time is plotted along the x-axis and the BER is plotted along the y-axis, the user can find an acceptable BER level and then scan horizontally across the diagram to find the timing margin at that BER. FIG. 4 illustrates exemplary Bathtub Curve diagram 40 constructed using a limited number of measurement points with measurements made on hardware with a very low noise floor. FIG. 5 illustrates exemplary Bathtub Curve diagram 45 constructed using a greater number of measurement points with measurements made on hardware with a raised noise floor. It should again be noted that the opening at the bottom of the bathtub curve in FIG. 5 is narrowed relative to the opening at the bottom of the bathtub curve in FIG. 4.

A third measurement procedure provides a diagram known as an "Eye Diagram". Although Eye Diagrams are typically associated with oscilloscopes, a BERT version of an Eye Diagram, sometimes also referred to as an "Eye Map" or an "Eye Contour", can be created by plotting some representation of the BER versus a pair of control variables. For example, the offset time can be plotted along the x-axis and threshold voltage can be plotted along the y-axis. The BER at the plotted points can then be represented in various ways such as a color map, a contour plot or any of a variety of three-dimensional representations.

Figure 6:
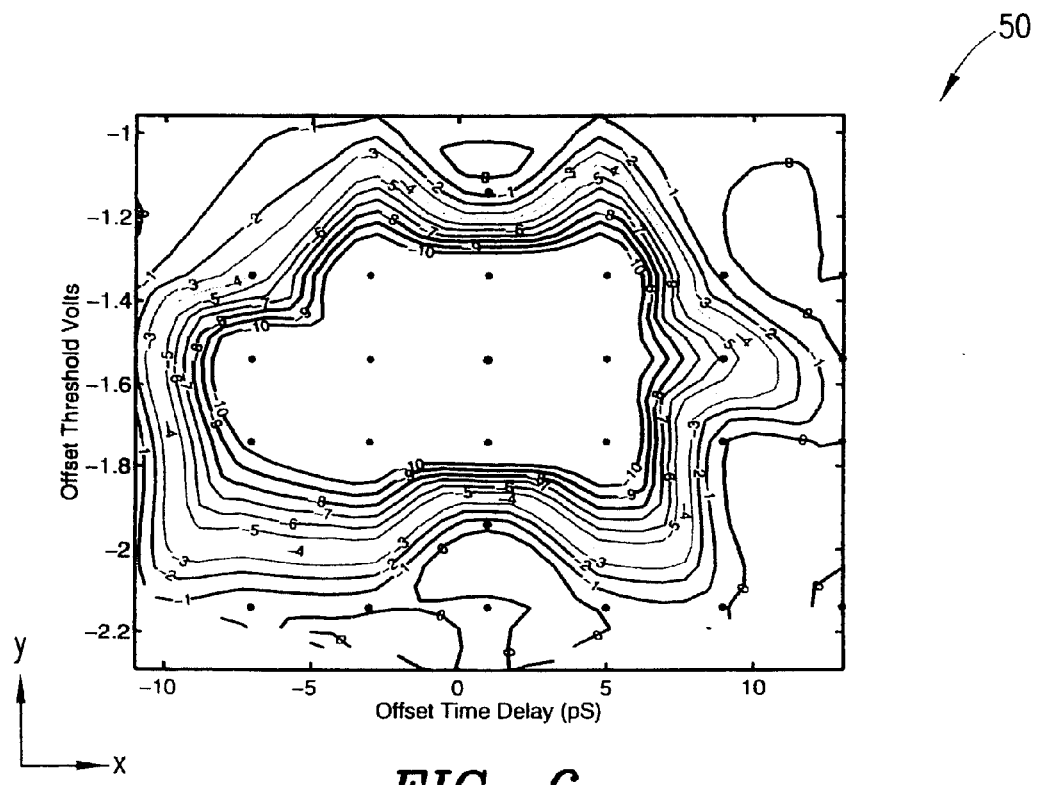
FIGS. 6–9 illustrate exemplary Eye Diagrams representing the relationship between bit error rate of a digital signal from a device under test, threshold voltage and offset time to assist in explaining the present invention.
Figure 7:
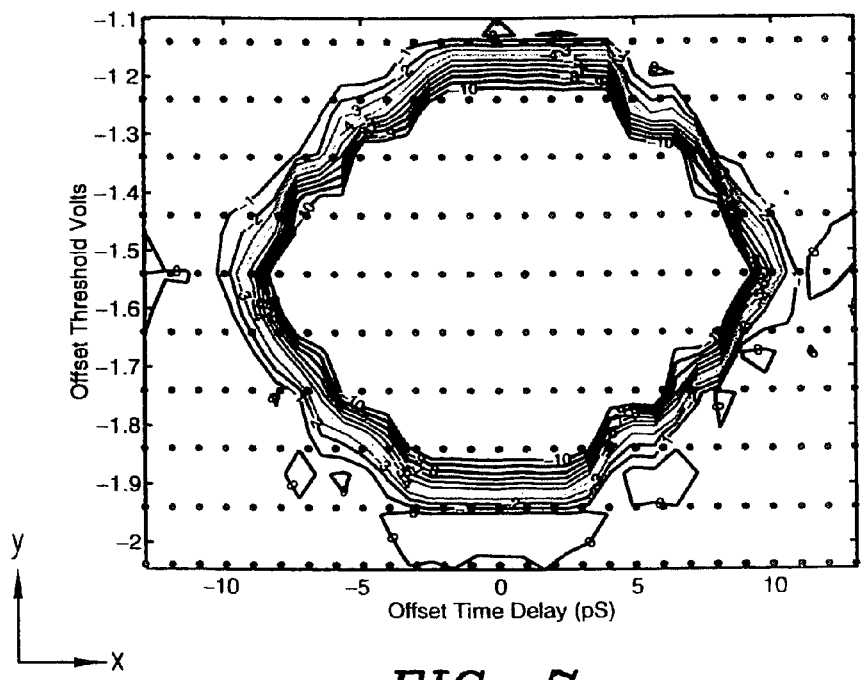
Figure 8:
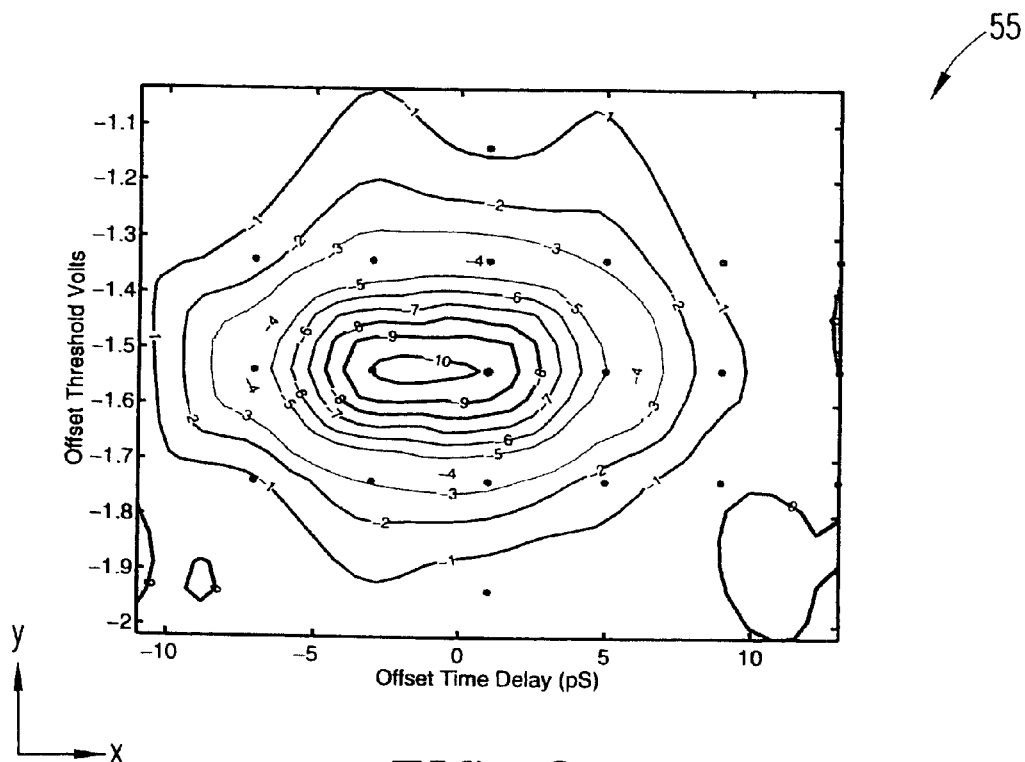
Figure 9:
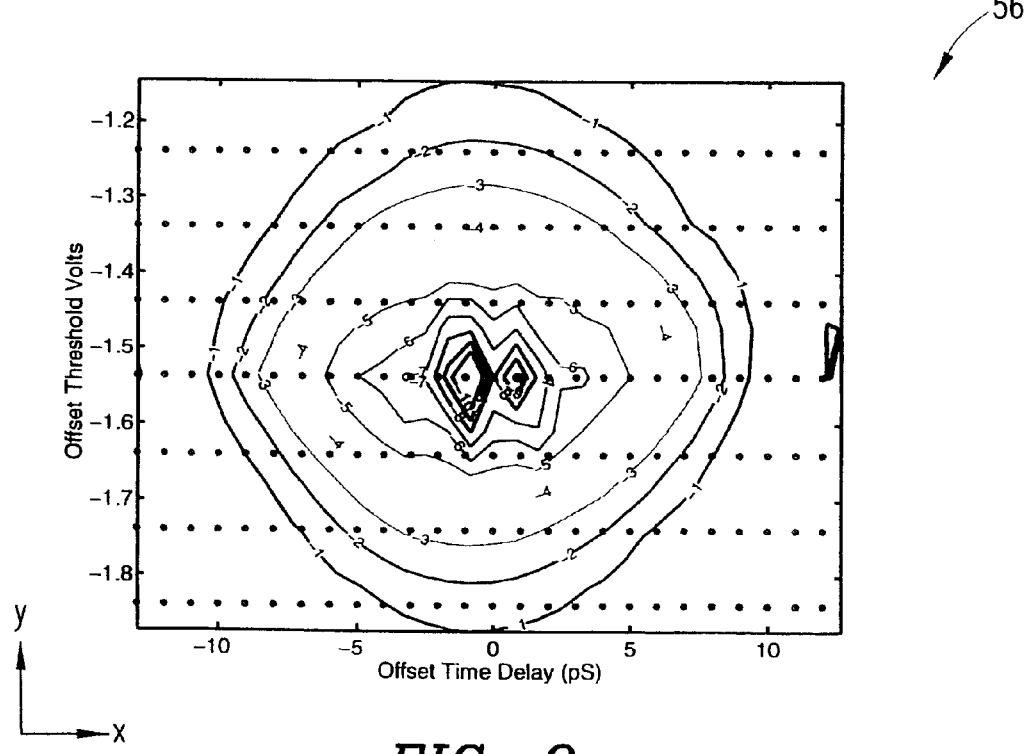

FIGS. 6–9 illustrate exemplary Eye Diagrams in which offset time is plotted along the x-axis, threshold voltage is plotted along the y-axis, and BER is represented as a contour plot. In particular, FIG. 6 illustrates exemplary Eye Diagram 50 with measurements made on hardware with a very low noise floor and limited sample points (48 points). FIG. 7 illustrates exemplary Eye Diagram 51 with measurements also made on hardware with a very low noise floor but with a larger number of measurement points (377 points). FIG. 8 illustrates exemplary Eye Diagram 55 with measurement points made on hardware with raised noise floor and limited sampling points (48 points). FIG. 9 illustrates exemplary Eye Diagram 56 with measurements also made on hardware with raised noise floor but with a larger number of sampling points (322 points). It is to be noted that the opening in the "eye" in the diagrams of FIGS. 8 and 9, i. e., the open portion of the diagram, is narrowed relative to the opening in the "eye" in the diagrams of FIGS. 6 and 7.

Constructing a diagram representing the relationship between variable quantities, such as the V Curve diagrams in FIGS. 2 and 3, the Bathtub Curve diagrams in FIGS. 4 and 5, and the Eye Diagrams in FIGS. 6–9, requires the plotting of a plurality of measurement points. Each of the measurement points in FIGS. 2 and 3 represents the BER at a particular threshold voltage value. Similarly, each of the measurement points in FIGS. 4 and 5 represents the BER at a particular offset time value; and each of the measurement points in FIGS. 6–9 represents the relationship between the BER and a particular threshold voltage and a particular offset time. As should be apparent from FIGS. 2–9, the greater the number of measurement points used to construct the diagrams, the more accurately the diagrams will represent the relationship between the variable quantities. As should also be apparent from the figures, however, many of the additional measurement points tend to provide little added information.

In order to establish a particular bit error rate, e. g., the bit error rate at a particular threshold voltage or at a particular offset time, some number of bit errors must be measured. When the bit error rate is high, the measurement of a sufficient number of bit errors to statistically establish the bit error rate can be made relatively easily. When the bit error rate is low, however, the time required to statistically establish the bit error rate may become prohibitive.

For example, to measure 100 bit errors in a signal having a bit error rate of $10^{-6}$ (i.e., one bit error for every $10^6$ bits), requires measuring on the order of $10^8$ bits. For a bit rate of 10 Gbps, this will require about 0.01 seconds. For a bit rate of 10 Mbps, however, the measurements will require about 10 seconds. Table 1 illustrates different measurement times to measure 10 bit errors and 100 bit errors for different bit rates and error rates. From Table 1, it should be apparent that low bit error rates take significantly longer to measure than high bit error rates.

TABLE 1

| | | Measurement Time | |
|---|---|---|---|
| Error Rate | Bit Rate | 10 Errors | 100 Errors |
| $10^{-6}$ | 10 Mbps ($10^7$ bps) | 1 s | 10 s |
| $10^{-6}$ | 10 Gbps ($10^{10}$ bps) | 0.001 s | 0.01 s |
| $10^{-9}$ | 10 Gbps ($10^{10}$ bps) | 1 s | 10 s |
| $10^{-9}$ | 40 Gbps ($4 \times 10^{10}$ bps) | .25 s | 2.5 s |
| $10^{-10}$ | 40 Gbps ($4 \times 10^{10}$ bps) | 2.5 s | 25 s |
| $10^{-11}$ | 40 Gbps ($4 \times 10^{10}$ bps) | 25 s | 250 s |
| $10^{-12}$ | 40 Gbps ($4 \times 10^{10}$ bps) | 250 s | 2500 s |

In some measurement procedures, the time during which bit errors are measured in order to determine the bit error rate is limited in order to reduce the overall measurement time required to construct a diagram. Particularly when the bit error rate is low, the limited time may be insufficient to provide an adequate measurement of bit errors to statistically establish an accurate bit error rate; and this can result in an inaccurate diagram.

Figure 10A:
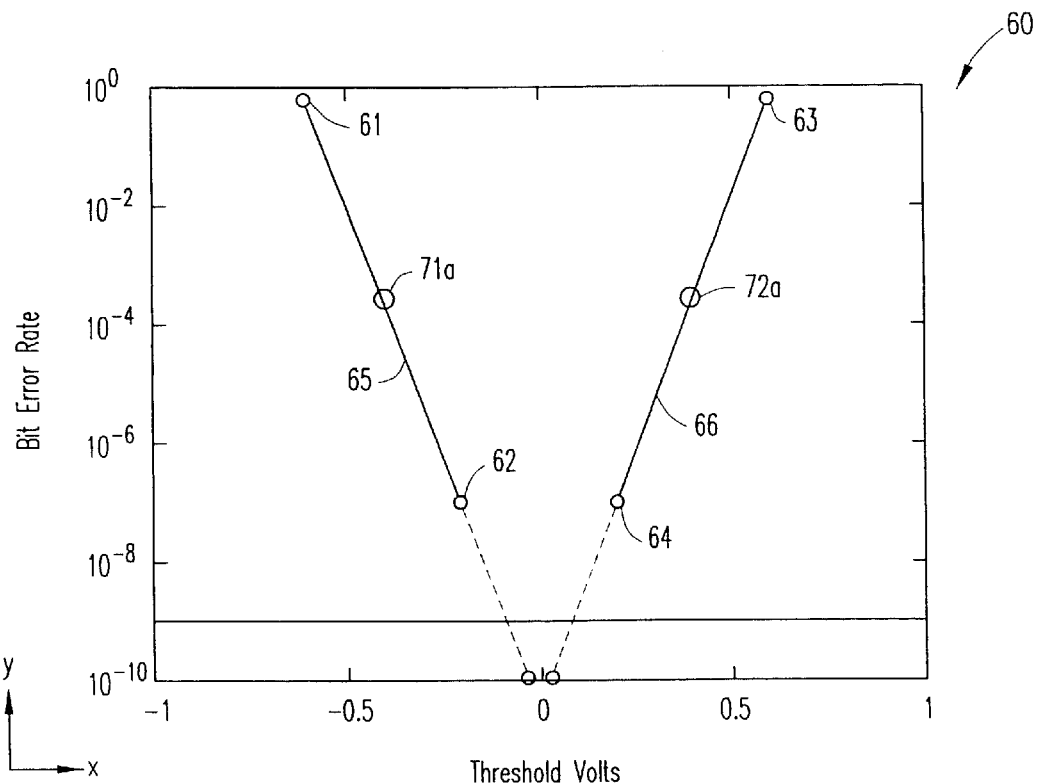
FIGS. 10A–10C schematically illustrate steps of a method for constructing a V Curve diagram according to an embodiment of the present invention.
Figure 10B:
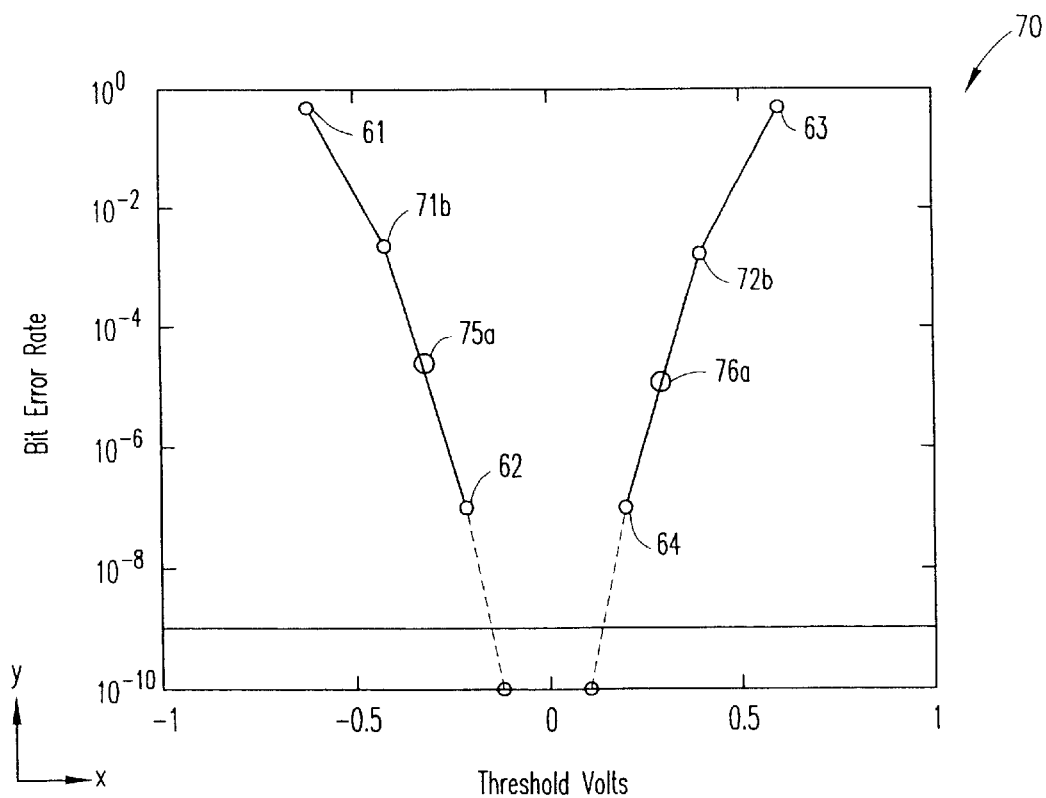
Figure 10C:
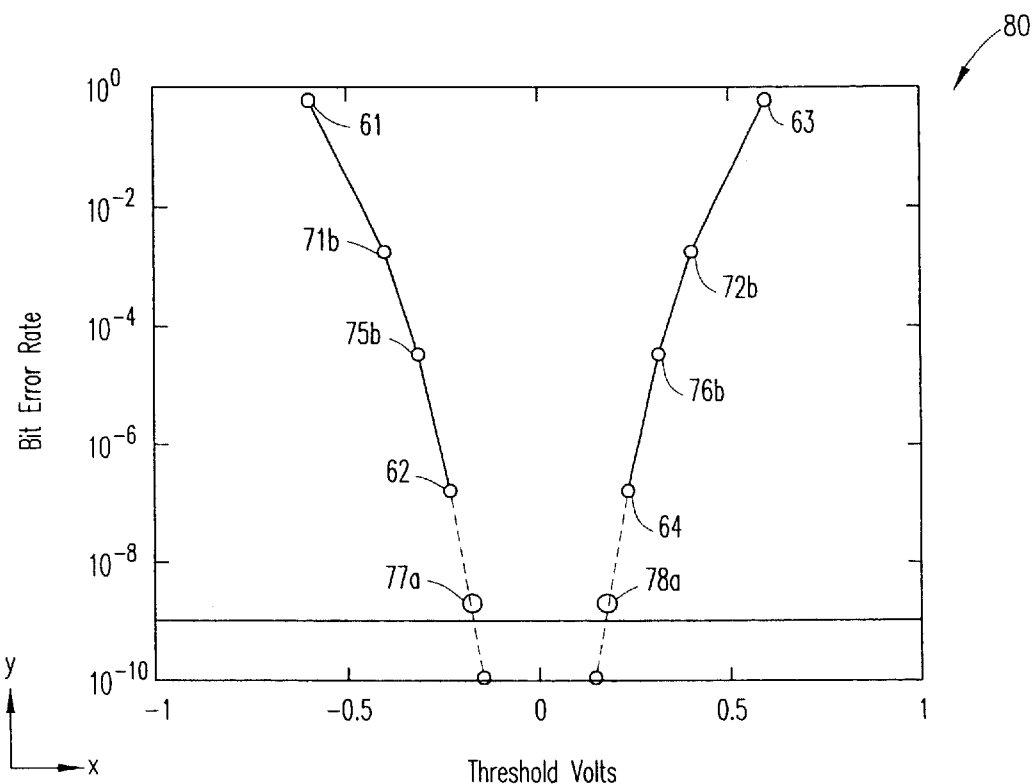

FIGS. 10A–10C schematically illustrate steps of a method for constructing a V Curve diagram according to an embodiment of the present invention. In particular, FIGS. 10A–10C are graphs that illustrate steps of a method for constructing V Curve diagram 80 (shown in FIG. 10C) that represents the relationship between bit error rate (BER) of a digital signal from a device under test (DUT) and threshold voltage utilizing, for example, a bit error rate tester such as illustrated in FIG. 1. In FIGS. 10A–10C, offset voltage is plotted along the x-axis and BER is plotted along the y-axis.

As a first step in the method, at least one first measurement point is provided that represents the relationship between threshold voltage and BER. In the embodiment illustrated in FIGS. 10A–10C, four first measurement points 61, 62, 63 and 64 are provided. This is intended to be exemplary only. The at least one first measurement point can comprise any number of measurement points depending on the nature of the diagram being constructed, the needs of a particular user and on other factors. When constructing a V Curve diagram, however, it is usually preferred that the at least one first measurement point comprises at least four first measurement points to permit a V Curve diagram such as initial V Curve diagram 60 in FIG. 10A to be defined by the first measurement points.

First plurality of measurement points 61–64 can be provided by selecting desired threshold voltage values and then measuring the BER at each of the selected threshold voltage values. When providing the first measurement points in this manner, the threshold voltage comprises a control variable and the BER comprises an output variable. Alternatively, desired BER values can be selected and the threshold voltage measured for each of the selected BER values. When providing the points in this manner, the BER is the control variable and the threshold voltage is the output variable.

Selection of the control variable values at which the output variable values are to be measured can be based on one or more criteria. For example, when constructing a V Curve diagram, it is usually desirable to provide first measurement points having both positive and negative threshold voltage values so that both arms of the V Curve can be initially defined by the first measurement points. Also, it may be desirable to provide the first measurement points at positions that are substantially spaced from one another such that the initial V Curve diagram covers a large portion of the over all measurement region of the diagram. In addition, it might be desirable to select control variable values at which the relationship between the threshold voltage and the BER can be measured relatively easily (e.g., at positions where the BER values are relatively high).

After first plurality of measurement points 61–64 have been provided, at least one location is selected at which the relationship between the threshold voltage and BER is to be measured. Each at least one location is selected as a function of first plurality of measurement points 61–64. Specifically, as shown in FIG. 10A, first measurement points 61–64 define initial V Curve diagram 60 that can be visualized by drawing lines 65 and 66 to connect points 61 and 62 and points 63 and 64, respectively. As illustrated by the dotted lines in FIG. 10A, lines 65 and 66 can also be extended beyond the measurement points, if desired, to further define initial V Curve diagram 60. Initial V Curve diagram 60 is then used to select the at least one location at which the relationship between threshold voltage and BER is to be measured.

In the embodiment illustrated in FIGS. 10A–10C, initial V Curve diagram 60 is used to select locations 71a and 72a at which the relationship between threshold voltage and BER are to be measured. As shown in FIG. 10A, locations 71a and 72a are positioned on lines 65 and 66 of initial V Curve diagram 60 so as to be substantially equally spaced between measurement points 61 and 62 and 63 and 64, respectively. The relationship between the variable quantities is then measured at locations 71a and 72a to determine the positions of additional measurement points for more accurately defining the V Curve diagram. As indicated above, this can be accomplished either by measuring the BER at the threshold voltage values specified at locations 71a and 72a, or by measuring the threshold voltage values for the BER values specified at locations 71a and 72a.

After the measurements are made, the actual positions of the additional measurement points are known and can be plotted on the graph to more accurately define the V Curve diagram. Thus, FIG. 10B illustrates more accurate V Curve diagram 70 constructed using first plurality of measurement points 61–64 and additional plurality of measurement points 71b and 72b.

By utilizing more precise V Curve diagram 70 of FIG. 10B, yet additional locations at which the relationship between threshold voltage and BER are to be measured can be selected to provide additional measurement points to further improve the accuracy of the V Curve diagram. Such additional locations are designated by reference numbers 75a and 76a in FIG. 10B, and comprise locations on improved V Curve diagram 70. After the relationship between threshold voltage and BER has been measured at locations 75a and 76a, the positions of the additional measurement points are known and can be plotted on the graph to yet further improve the V Curve diagram. FIG. 10C illustrates yet further improved V Curve diagram 80 constructed using previously provided measurement points 61–65 and 71b and 72b and additional measurement points 75b and 76b.

If V Curve diagram 80 in FIG. 10C is of sufficient detail to satisfy the particular needs of a user, the method for constructing a V Curve diagram is complete. If, however, an even more accurate V Curve diagram is desired, the steps of selecting additional locations at which the relationship between threshold voltage and BER is to be measured, and measuring the relationship at the additional locations to provide additional measurement points are repeated as many times as desired until a sufficiently accurate V Curve diagram has been constructed. Examples of additional locations at which measurements may be made to construct a more accurate V Curve diagram are indicated by points 77a and 78a in FIG. 10C.

In general, according to the embodiment illustrated in FIGS. 10A–10C, a V Curve diagram, such as V Curve diagram 80 is constructed step-by-step in an iterative manner. As a result of each iteration, at least one additional measurement point is provided as a function of all previously provided measurement points. Stated differently, the locations at which the relationship between threshold voltage and BER is measured in each iteration are selected in accordance with some function of the previously provided measurement points rather than by simply constructing the diagram using a raster method as is done in conventional procedures for constructing V Curve diagrams.

By intelligently selecting the locations at which measurements are to be made, it often becomes possible to construct a diagram that accurately represents the relationship between the variable quantities using a fewer number of measurement points than with conventional procedures. By using intelligently selected locations for measurement, the time required to construct the diagram can also often be significantly reduced, and a diagram that better meets the needs of a particular user can be constructed.

Selection of the locations at which the relationship between threshold voltage and BER are to be measured can be based on one or more of a plurality of different functions. For example, location selection can be based solely as a function of the values of the control variable at the previously provided measurement points. In such a situation, if the control variable is threshold voltage, locations can be selected that have threshold voltage values that differ significantly from the threshold voltage values at the previously provided measurement points, and the BER at those locations are measured to provide additional measurement points. The locations can also be selected as a function of the values of both the control variable and the output variable at the previously provided measurement points. In such a situation, locations may be selected at which both threshold voltage values and BER values differ as much as possible from those values at the previously provided measurement points.

Additional locations may also be selected as a function of the locations of previously provided measurement points and the time required to measure the relationship between threshold voltage and BER. As discussed previously, the measurement of the BER at high BER values takes significantly less time than at low BER values. Accordingly, measurement locations might be selected as a function of the positions of previously provided measurement points and the time required to complete the measurements at the locations. One example of how this might be done is to select a reduced number of locations that have low BER values. Another example might be to specify a period of time during which all measurements to construct the diagram will be made (e.g., 10 minutes or 1 hour), and selecting locations that will maximize the quality of the diagram that can be constructed in the specified period of time.

Yet further, additional locations might be selected as a function of the positions of previously provided measurement points and BER values that are of particular interest to the user. Thus, a user might select locations that are close to desired BER values as identified by the previously provided measurement points to construct a V Curve diagram that is particularly accurate in the vicinity of the BER values of interest.

The above functions are intended to be exemplary only. Locations at which measurements are to be made can also be selected based on other functions of previously provided measurement points or on various combinations of functions, and it is not intended to limit the invention to any particular functions.

Figure 11A:
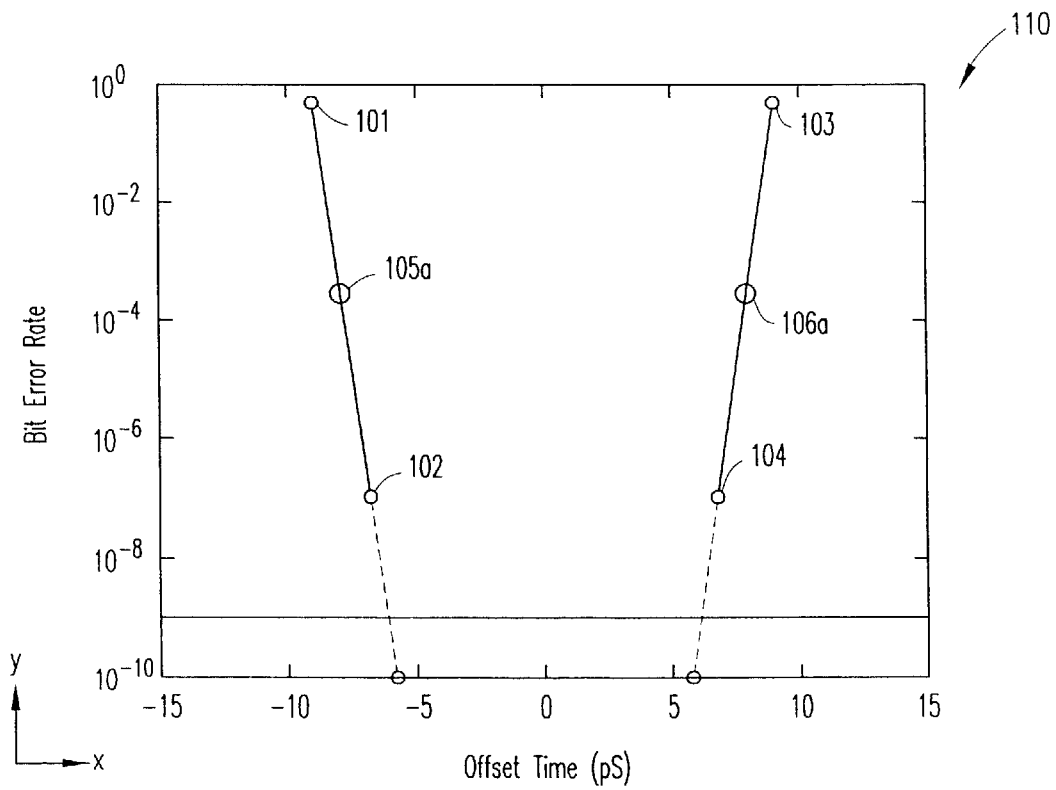
FIGS. 11A–11C schematically illustrate steps of a method for constructing a Bathtub Curve diagram according to an embodiment of the present invention.
Figure 11B:
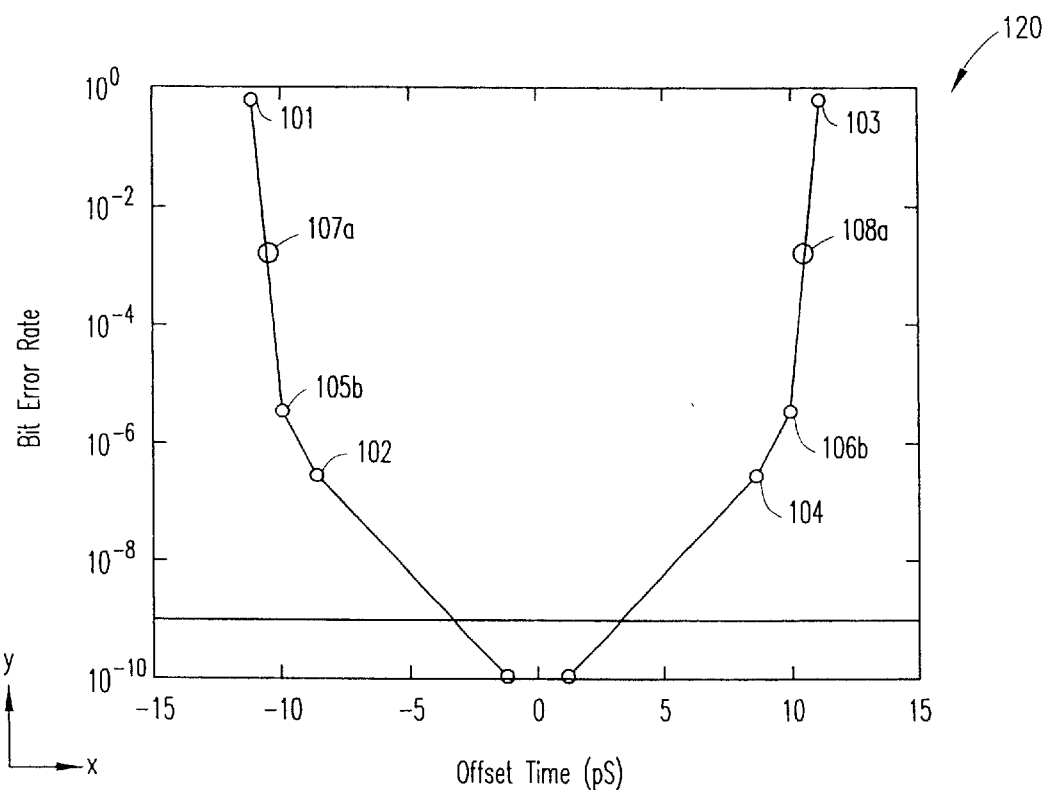
Figure 11C:
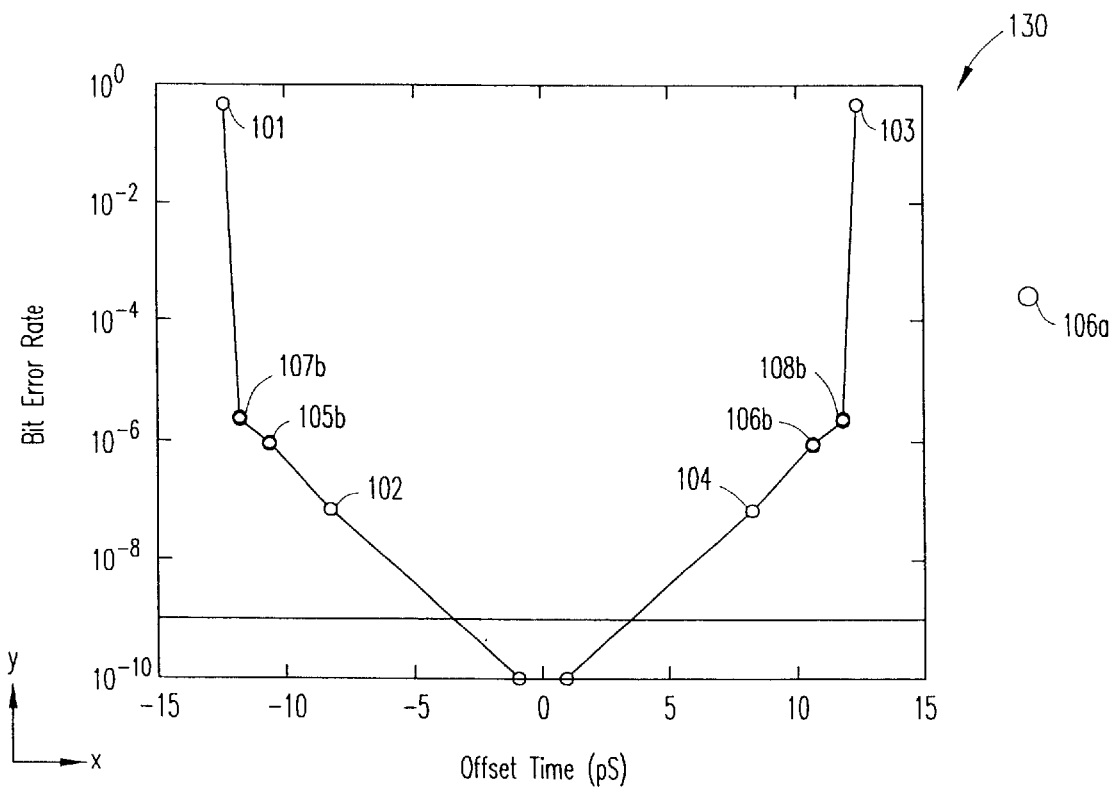

FIGS. 11A–11C schematically illustrate steps of a method for constructing a Bathtub Curve diagram according to another embodiment of the present invention. More particularly, FIGS. 11A–11C are graphs that illustrate steps of a method for constructing Bathtub Curve diagram 130 (shown in FIG. 11C) that represents the relationship between the BER of a digital signal from a DUT and offset time using a bit error rate tester such as BERT 10 illustrated in FIG. 1. In FIGS. 11A–11C, offset time is plotted along the x-axis and BER is plotted along the y-axis.

The method illustrated in FIGS. 11A–11C is substantially identical to the method described with reference to FIGS. 10A–10C; and, accordingly, is not described in detail herein. In general, first plurality of measurement points 101, 102, 103 and 104 are provided to define initial Bathtub Curve diagram 110 as shown in FIG. 11A. The locations 105a and 106a at which additional measurements are to be made are then selected as a function of first plurality of measurement points 101–104, and the relationship between offset time and BER at the selected locations is then measured to provide additional measurement points 105b and 106b as illustrated in FIG. 11B. Improved Bathtub Curve diagram 120 is then constructed using all the measurement points 101–104 and 105b and 106b as shown in FIG. 11B, and improved Bathtub Curve diagram 120 is then used to select further locations 107a and 108a at which measurements are to be made. The relationship between offset time and BER is then measured to provide further additional measurement points 107b and 108b to construct Bathtub Curve diagram 130. As in the embodiment of FIGS. 10A–10C, the process can be repeated in an iterative manner until a Bathtub Curve diagram of desired accuracy has been constructed.

FIGS. 10A–10C and 11A–11C illustrate steps of methods for constructing diagrams that represent the relationship between two variable quantities, i.e., BER and threshold voltage and BER and offset time. These are intended to be exemplary only as the invention can also be utilized to construct diagrams representing the relationship between other variable quantities. Furthermore, the present invention can be utilized to construct diagrams representing the relationship between more than two variable quantities. For example, the present invention can also be used to construct Eye Diagrams that represent the relationship among three quantities. The present invention is, in fact, particularly useful in constructing diagrams such as Eye Diagrams because the three-dimensional nature of such plots (two control variables and one output variable) increases the opportunities for intelligent point selection.

Methods for constructing an Eye Diagram according to embodiments of the present invention are generally similar to the methods described above in connection with FIGS. 10A–10C and 11A–11C in that a first set of measurement points are provided to construct an initial Eye Diagram, and using this initial Eye Diagram, the locations at which the relationship among offset voltage, offset time and BER are to be measured are selected as a function of previously provided measurement points. The relationship is then measured at the locations to provide additional measurement points to construct a more accurate Eye Diagram. Also as in the previous embodiments, the process may be repeated in an iterative manner to provide further measurement points to construct an increasingly accurate Eye Diagram.

Before describing in detail methods for constructing Eye Diagrams according to embodiments of the present invention, it is believed that it would be useful to first summarize three basic criteria that have been established for selecting locations at which measurement points are to be determined:

1. Separate the measurement points. By separating measurement points, newly generated points will provide good coverage within the region of the diagram. This can be done based on control variables only, or on both control and output variables.
2. Avoiding certain areas. For example, a criterion might be to avoid areas where the BER is so low that it takes a long time to complete measurements.
3. Select measurement points at which it is estimated that there is an interesting BER. For example, one might estimate from a set of measurement points a contour of an Eye Diagram around which the BER is at some constant level. Measurement points are then selected that correspond to this estimated BER.
4. Any of 1–3 above where an estimated BER surface is used to compute a measurement time at a proposed measurement point.
5. Combinations of criteria. The various criteria can be combined in various proportions to give a desired weighting to generating points that suit one problem versus another.

The above criteria can also be cast as optimization problems as described below.

Maximum Distance

The location at which a measurement is to be made can be selected to maximize the distance between existing measurement points and at least one additional measurement point. At the same time, it can be specified that the at least one additional measurement point be anywhere within the over all measurement region of the diagram (either between existing measurement points or outside existing measurement points), or that it be within some specified region of the diagram.

For a given set of points, $\{x_i, z_i\}$ where the x's correspond to the independent variable in a 1-dimensional optimization problem and the z's correspond to the dependent variable in such a problem, $$\text{Maximize } \{\min\{\|x_n-x\|^p+\|z_n-z\|^p\}\} \quad (1)$$

for all $x \in \{x_l\}$ and $z \in \{z_l\}$, where $\{x_n, z_n\}$ is the new point, and $\|\cdot\|^p$ corresponds to the p-norm, a form of distance measurement. In the case where p=1, the p-norm corresponds to the sum of the absolute values of the vector elements. In the case where p=2, the p-norm corresponds to the product of a vector with it's complex conjugate transposed (in the case of complex numbers) and is used for calculating the Euclidean distance. In the case where p=∞, the p-norm selects the single element with the largest absolute value.

The above optimization problem is set for one independent variable, such as with respect to V Curves or Bathtub Curves. The problem can be expanded to a problem with two independent variables, x and y, such as eye diagrams, as follows:

$$\text{Maximize } \{\min\{\|x_n-x\|^p+\|y_n-y\|^p+\|z_n-z\|^p\}\} \quad (2)$$

for all $x \in \{X_i\}$, $y \in \{y_l\}$, and $z \in \{z_l\}$, where $(x_n, z_n)$ is the new point, and $\|\cdot\|^p$ corresponds to the p-norm. For example, in a typical eye diagram measurement, x might correspond to the time delay offset and y might correspond to the threshold voltage offset.

Note that for certain measurements, the dependent variable may relate to the independent variable in an exponential fashion. Such data are often plotted on logarithmic axes to make them more understandable. This is most typically the case with V Curves and Bathtub Curves. Thus, it may be that for optimization, the dependent variable z is chosen to be a logarithmic function of the BER, allowing the effect of the dependent variable to be factored into the problem in a reasonable way.

Maximum Distance Between Points but Avoiding Low BER Points

Maximizing the distance between the points is only one optimization. A second optimization stays away from measuring too many low BER points. If $\{z_l\}$ are logarithmic functions of BER values, then $$\text{Maximize}\left(\min\{\|x_n - x\|^p + \|y_n - y\|^p + \|z_n - z\|^p\} + K\left(\frac{1}{|z_n|}\right)\right) \quad (3)$$

Where $z_n \neq 0$ and K is a scaling factor between the two desired optimizations.

Maximum Distance Between Points, Subject to a Constant Value of Estimated BER

In this case, we use a contour of constant estimated BER and then maximize the distance between the points on that contour.

$$\text{Maximize } \{\min\{\|x_n-x\|^p+\|y_n-y\|^p\}\} \quad (4)$$

such that $z_n = z = $ constant.

Using Functions of the Control and Output Variables

All of the above criteria can be modified to make use of functions of the control and output variables instead of merely the variables themselves. These functions may include filtering or smoothing, or may map the variables into a space that makes estimation of the BER surface more accurate. For example, the BER data itself is exponential in nature, which would tend to de-emphasize points taken at lower Bit Error Rates. One correction that can be applied is to take the logarithm of the BER data. This lets the surface estimate take into account all of the measurement points, rather than simply those with high bit error rates.

Normalization/Scaling

Normalization is a function of the variables that requires special mention. Surface fitting algorithms typically assume that the variables are all scaled the same way. This can be a problem in Eye Diagram construction when one variable is in volts and one is in tens of picoseconds. To remove this as a factor, the variables can be normalized/scaled to have the same general size or magnitude before doing surface fits. In combination with taking the logarithm of BER data, this vastly improves the accuracy of the 3-Dimensional surface fit.

Modulating Measurement Time

Do any of the above, but compute the estimated measurement time through the estimated BER surface.

Figure 12:
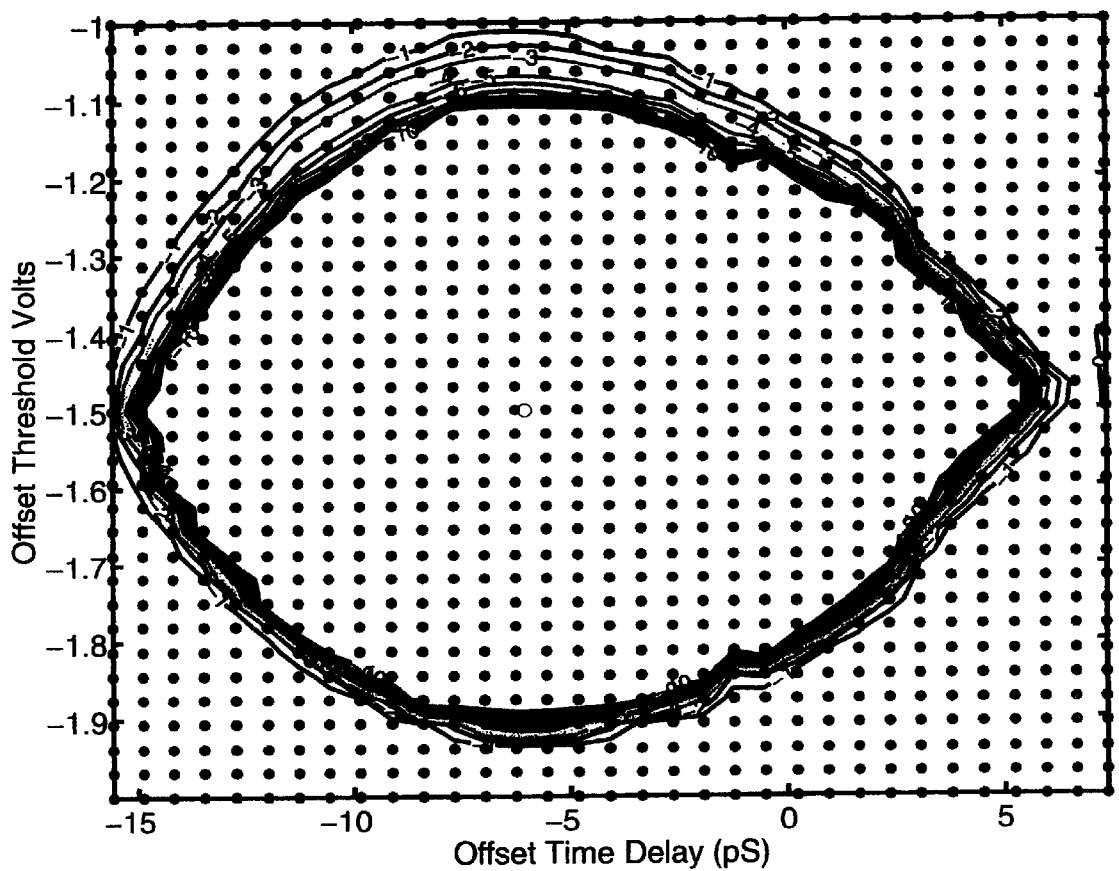
FIG. 12 schematically illustrates an exemplary raster generated Eye Diagram to assist in explaining the present invention.

In known procedures for constructing Eye Diagrams, a large number of measurement points is usually required to provide an accurate diagram. It is not uncommon, for example, to use over one thousand points to fully map out an Eye Diagram. FIG. 12 illustrates an exemplary baseline Eye Diagram for an open eye. The Eye Diagram in FIG. 12 is a raster generated eye map of bit error rates with time delay represented along the x-axis and threshold volts represented along the y-axis. The measurement points in the diagram of FIG. 12 were selected a priori with a uniformly spaced sweep in the x and y directions. The particular diagram shown in FIG. 12 required 1090 points, many of which provide little or no information. In accordance with the present invention, however, by intelligently selecting where the measurement points are to be located, a very significant reduction in the number of measurement points needed to construct an accurate Eye Diagram becomes possible.

The following discussion of actual measurements used to construct an Eye Diagram illustrates how the present invention can dramatically lower the number of measurements needed to obtain an accurate Eye Diagram. The following embodiments are versions of the following general embodiment described previously.

1. After an initial set of measurement points are generated, subsequent measurement points are spread out along functions of contours of constant bit error rate.
2. By efficiently spreading the points around the contour, the goal of separating measurement points with respect to the control variables is accomplished.
3. By specifying contours of constant bit error rate, a user is able to spread data points out in the dimension of the output variable (bit error rate) and also control the number of points measured at bit error rates that require a long time to specify.

An important issue in this embodiment is how to efficiently spread the points around the contour. To precisely spread points around a contour evenly requires computing the length of the entire contour, dividing that distance by the number of points desired on the contour to provide fixed increments, and then traveling from some initial point on the contour by those fixed increments to find new points. Although doable, such a process may be rather tedious.

According to embodiments of the invention, however, alternative procedures are provided to facilitate the spreading out of the measurement points. These embodiments include an "ellipse only" procedure, a "contour sampling only" procedure and a "combination" procedure. The ellipse only procedure is illustrated in FIGS. 13A–13E, and is based on the recognition that it is rather easy to spread points around an ellipse. Also, eye contours can often be reasonably approximated by ellipsoids. Thus, according to this embodiment, it is attempted to use an ellipse specific curve fit to the contour of constant BER, and points are then spread along the ellipse that approximates the contour.

Figure 13A:
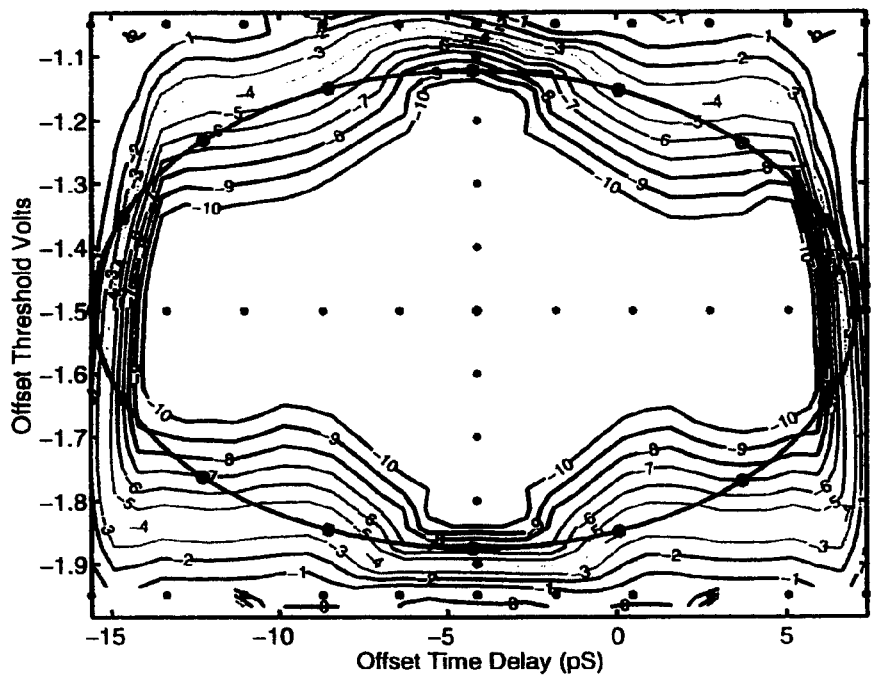
FIGS. 13A–13E schematically illustrate steps of a method for constructing an Eye Diagram according to an embodiment of the present invention.

FIG. 13A illustrates a first Eye Diagram in which the contours were first derived from an initial rough raster of points (44 points). The ellipse shown was fit to the $10^{-6}$ BER contour. The points were chosen at equal angles on a circle and then scaled according to the ellipse.

Figure 13B:
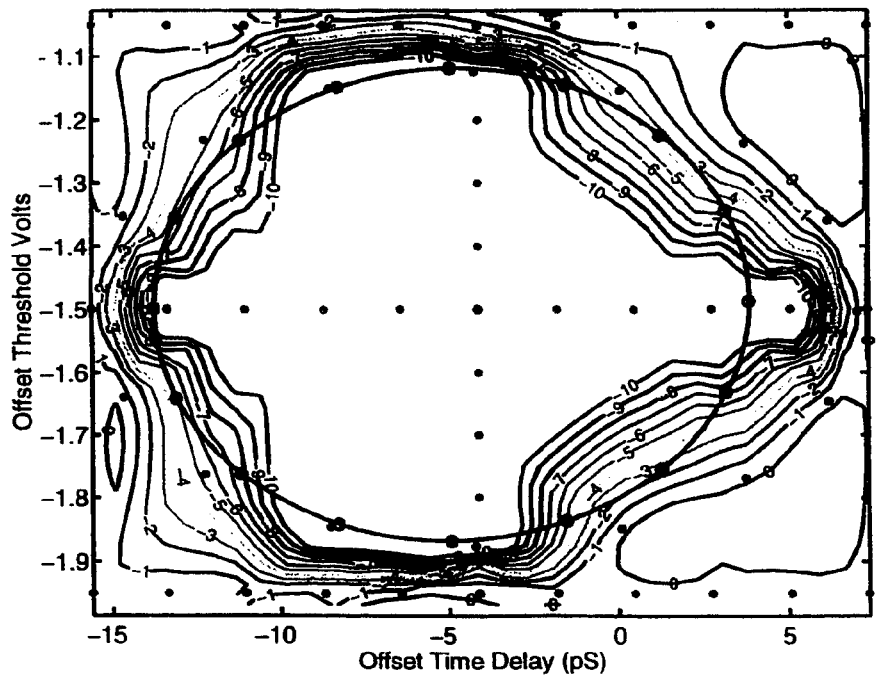

FIG. 13B illustrates a further defined Eye Diagram constructed using 59 points. From these curves, an ellipse was fit to the $10^{-8}$ BER. Points were chosen at equal angles on a circle and then scaled according to the ellipse.

Figure 13C:
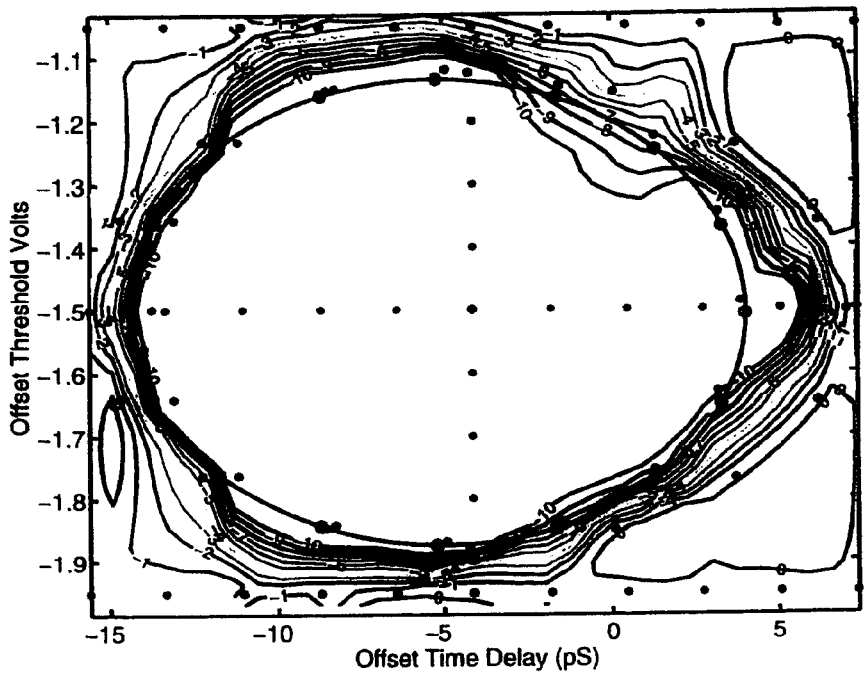

FIG. 13C illustrates a yet further defined Eye Diagram constructed using 75 points. From these curves, an ellipse fit to the $10^{-10}$ BER results in a valid ellipse. Points were chosen at equal angles on a circle and then scaled according to the ellipse.

Figure 13D:
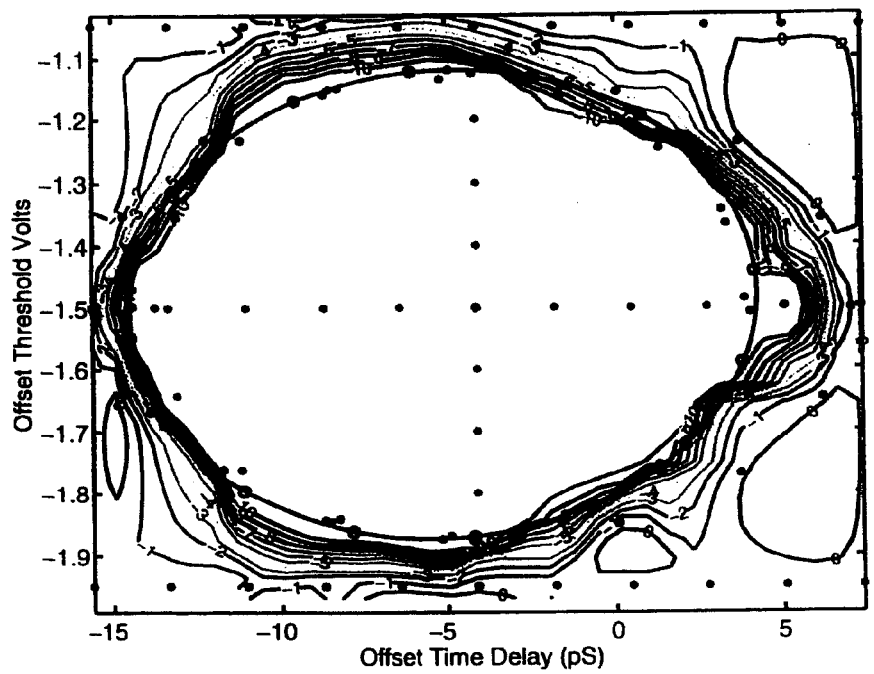

FIG. 13D illustrates an Eye Diagram constructed using 91 points From these curves, a second ellipse fit to the $10^{-10}$ BER results in a valid ellipse. Points were chosen at equal angles on a circle and then scaled according to the ellipse. In this case, the initial angle has been offset to rotate the measurement points relative to the previous ellipse.

Figure 13E:
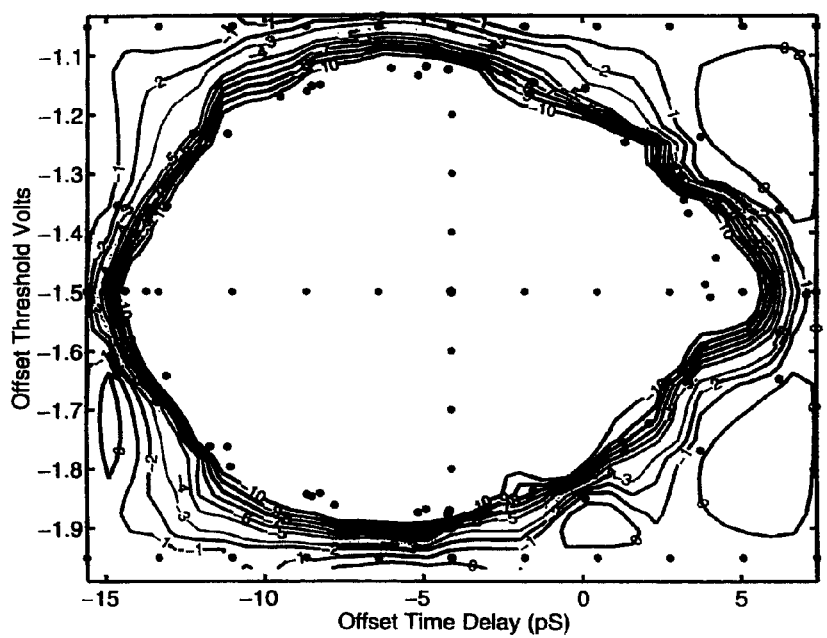

FIG. 13E illustrates the final BER map using 107 points. Note the high accuracy of the BER curves. The method spreads more measurements at areas of importance to the user than the raster method described previously, without excessive measurements at uninteresting locations. Note also that the measurement points are around the relevant BER contours rather than being clustered at one location.

From observation of the above-described method, it was determined that forcing the fit of an ellipse to data sometimes resulted in an ellipse that looked nothing like the data. Accordingly, in practicing the method, it is desirable to verify that a fit ellipse is within certain validity bounds. This can be done, for example, by checking the center point of the ellipse, by checking the length of the major and minor axes of the ellipse, and/or by checking the circumference of the ellipse against the validity bounds.

Because the ellipse sometimes fails to generate a valid ellipse for the purpose of generating measurement points, an alternative method may be used, if desired. According to this alternative method ("contour sampling only" method), the original contour, which is defined by a set of points, often called contour vertices, is used. The points denote locations where the contour changes direction and thus represents important points in the BER surface at that fixed error rate. FIGS. 14A–14E illustrate a sampling scheme in which one out of every M contour vertices constitutes the next measurement point is used. As long as M is less than the number of contour vertices, N, this is a valid scheme. This method allows the user to strike a balance between speed and accuracy of the measurement.

Figure 14A:
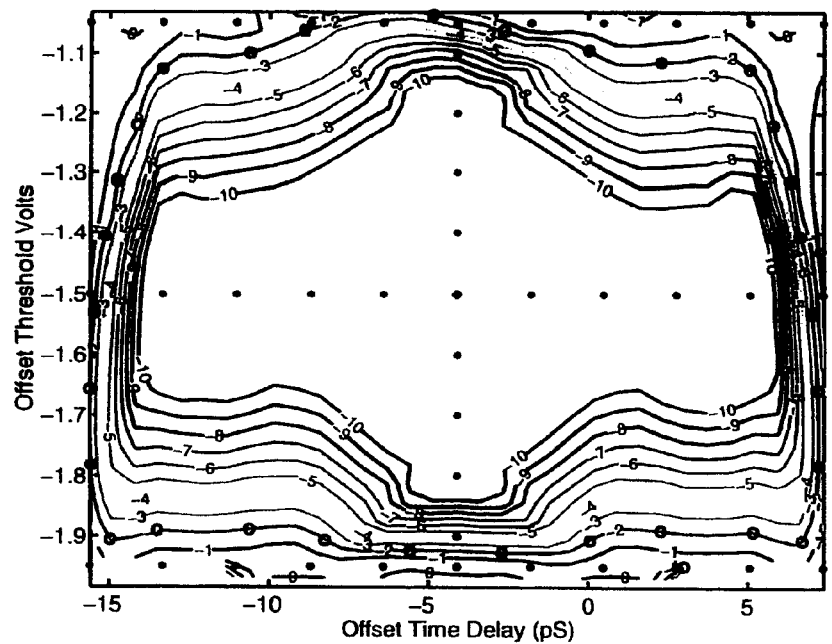
FIGS. 14A–14E illustrate steps of a method for constructing an Eye Diagram according to a further embodiment of the present invention.
Figure 14B:
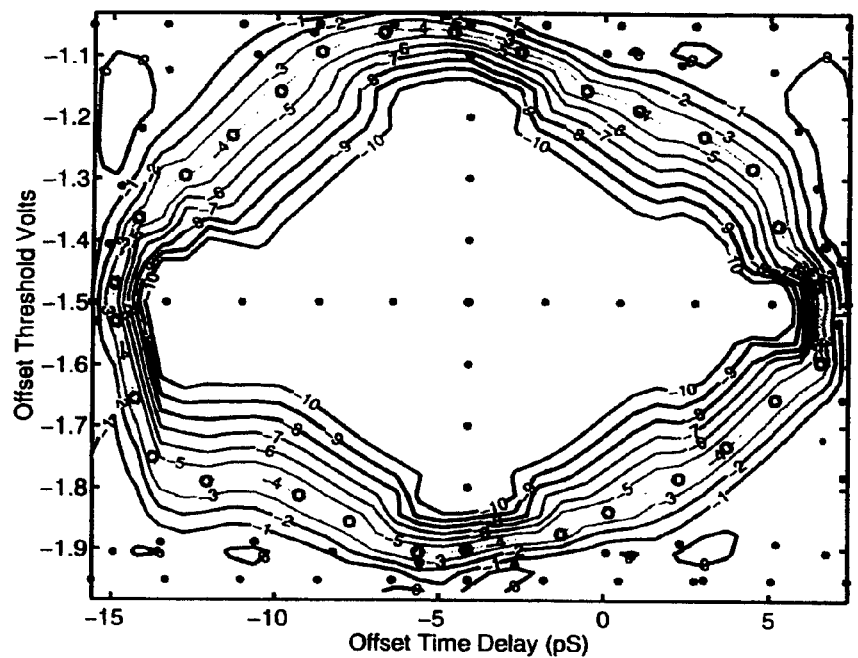
Figure 14C:
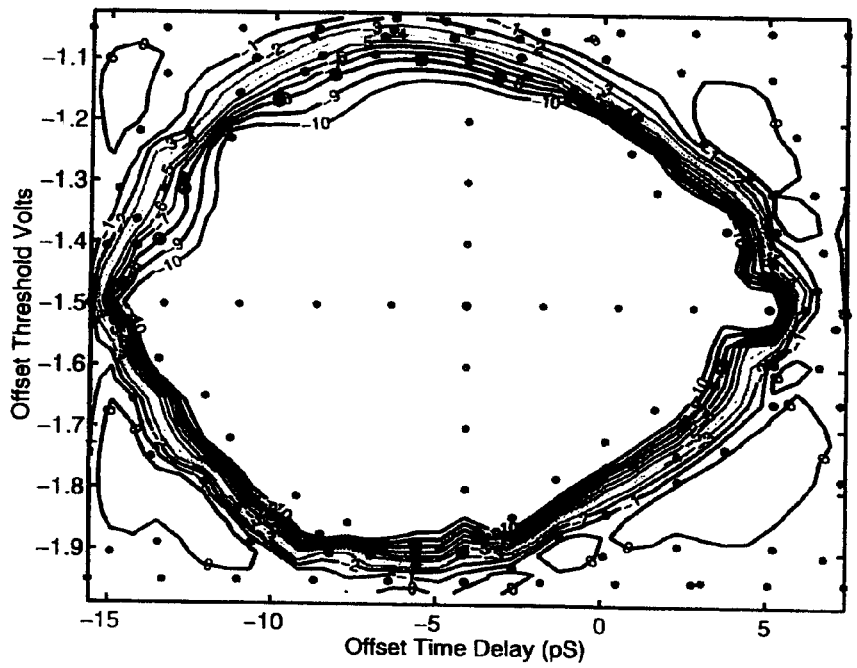
Figure 14D:
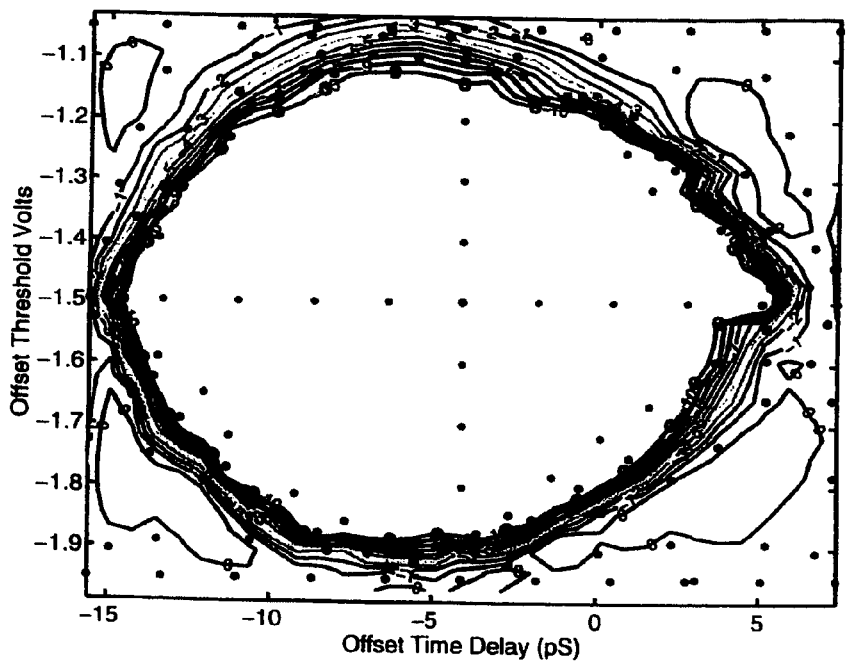
Figure 14E:
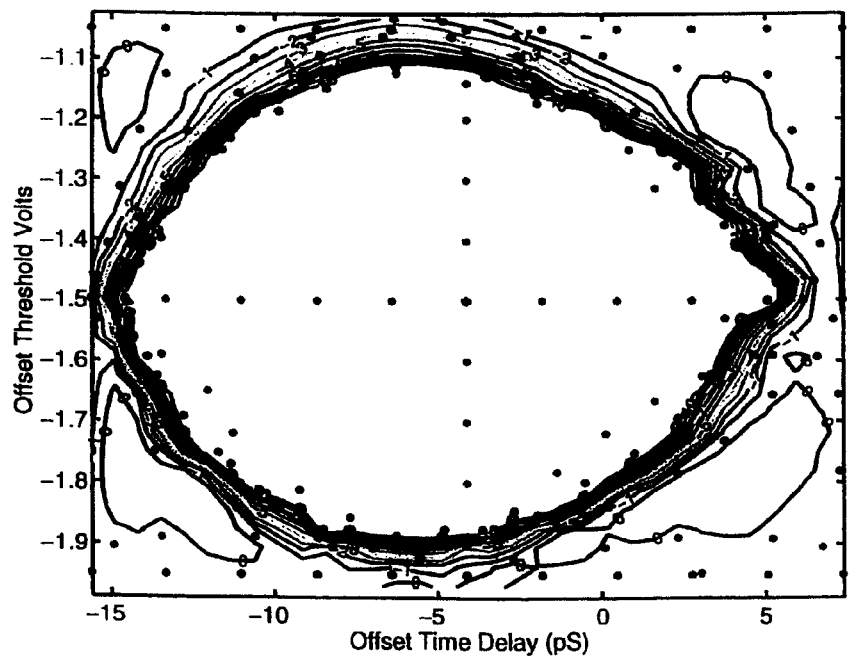

FIGS. 14A–14E are Eye Diagrams that illustrate the contour sampling only method according to an embodiment of the present invention. FIG. 14A illustrates an initial Eye Diagram constructed using 44 points using the contour sampling only method with sampling of the updated $10^{-2}$ contour. FIG. 14B shows the Eye Diagram constructed using 74 points sampling the updated $10^{-4}$ contour. FIG. 14C shows the Eye Diagram constructed using 131 points sampling the updated $10^{-8}$ contour. FIG. 14D shows the Eye Diagram constructed using 159 points sampling the updated $10^{-10}$ BER contour. FIG. 14E shows the final Eye Diagram constructed using 213 points. Note the high accuracy of the low BER curves. This method spreads more measurements at areas of importance to the user than the raster method, without excessive measurements at uninteresting locations. Note also that the measurement points are around the relevant BER contours, rather than being clustered at one location.

Yet a third method for constructing Eye Diagrams uses a combination of the ellipse only method and the contour sampling only method. According to this method, the ellipse method is first tried. If the ellipse fit of a particular contour is not valid, the contour sampling method is used. FIGS. 15A–15E are Eye Diagrams that illustrate the combination method.

Figure 15A:
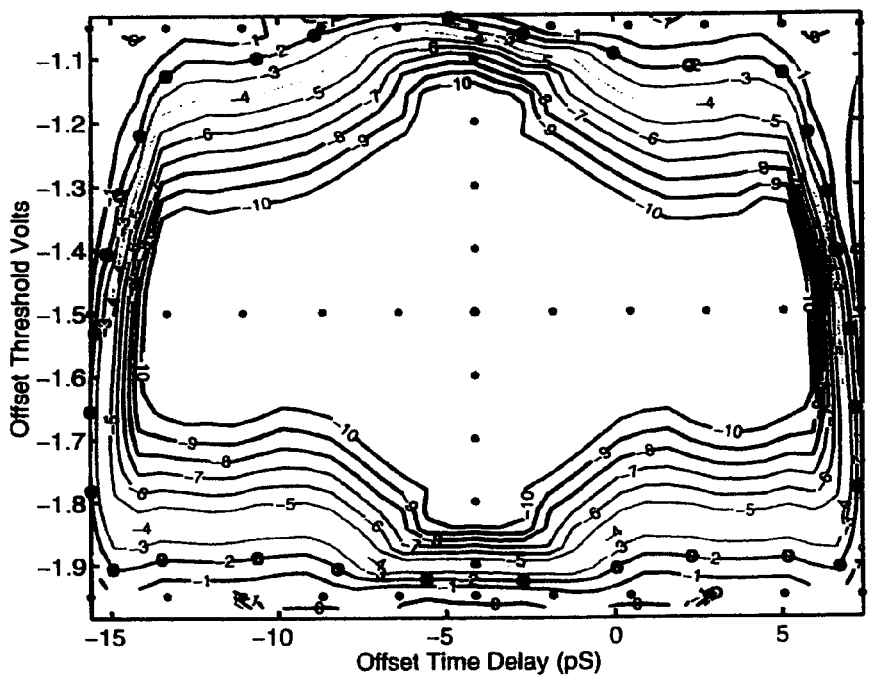
FIGS. 15A–15E illustrate steps of a method for constructing an Eye Diagram according to yet a further embodiment of the present invention.
Figure 15B:
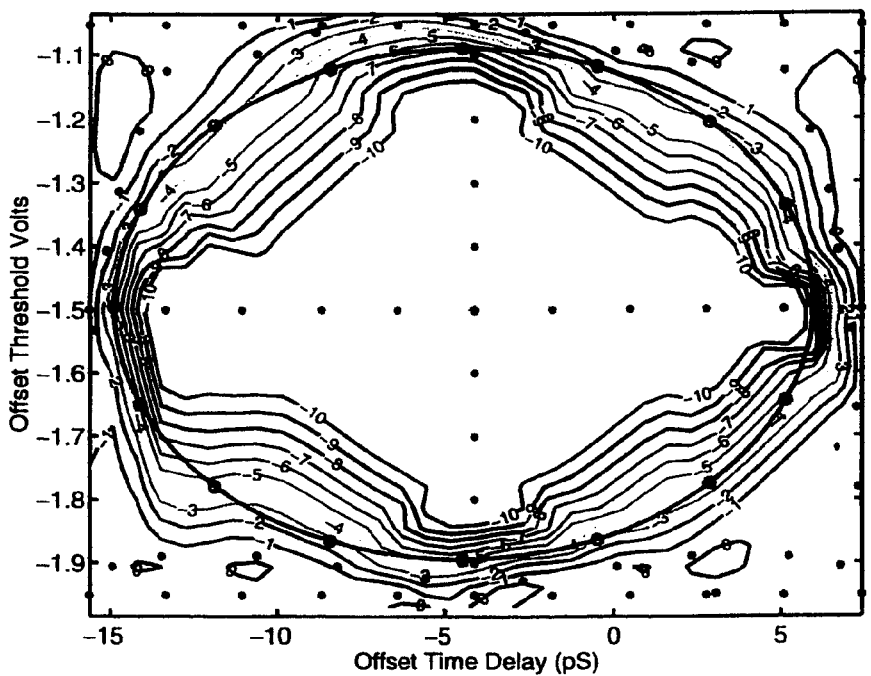

FIG. 15A illustrates an initial Eye Diagram of 44 points in which the contours are derived from an initial rough raster of points. From these curves, the ellipse fit to the $10^{-2}$ BER contour resulted in an invalid ellipse. The contour was then sampled to generate points. FIG. 15B illustrates the Eye Diagram constructed using 74 points. From these curves, the ellipse fit to the $10^{-4}$ BER contour results in a valid ellipse. Points are chosen at equal angles on a circle and then scaled according to the ellipse.

Figure 15C:
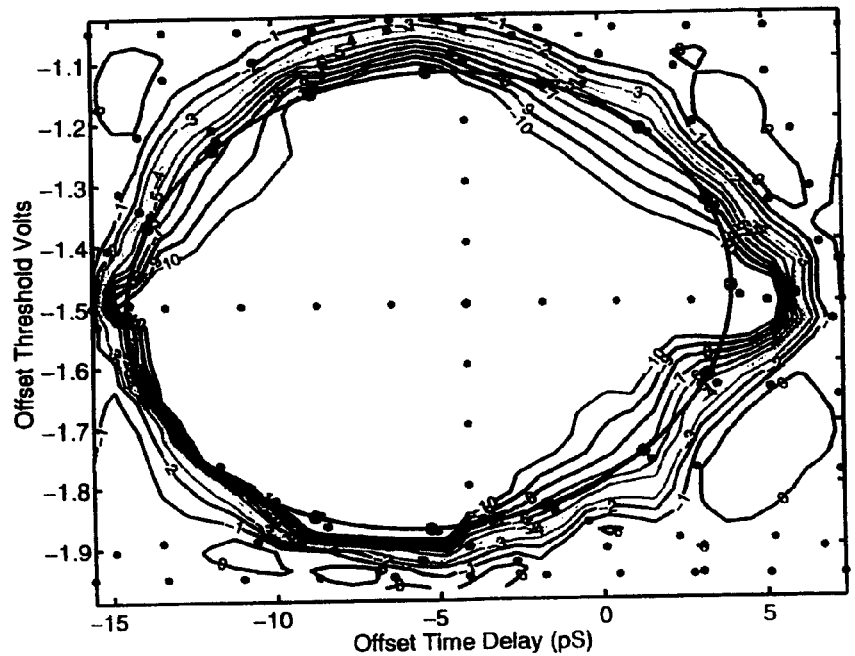

FIG. 15C illustrates the Eye Diagram constructed from 106 points. From these curves, an ellipse fit to the updated $10^{-8}$ BER curves resulted in a valid ellipse (although not shown herein, a valid ellipse also resulted from an ellipse fit to the $10^{-6}$ BER contour, and from a second ellipse fit to the updated $10^{-8}$ BER contour). Points were chosen at equal angles on a circle and then scaled according to the ellipse.

Figure 15D:
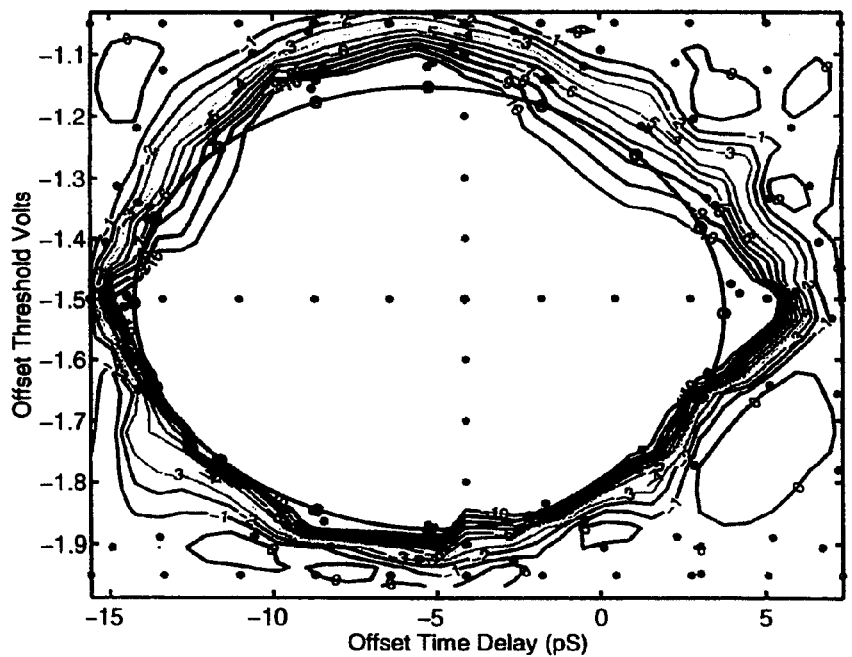

FIG. 15D illustrates the Eye diagram constructed from 122 points. From these curves, an ellipse fit to the updated $10^{-10}$ BER contour results in a valid ellipse. Points were chosen at equal angles on a circle and then scaled according to the ellipse.

Figure 15E:
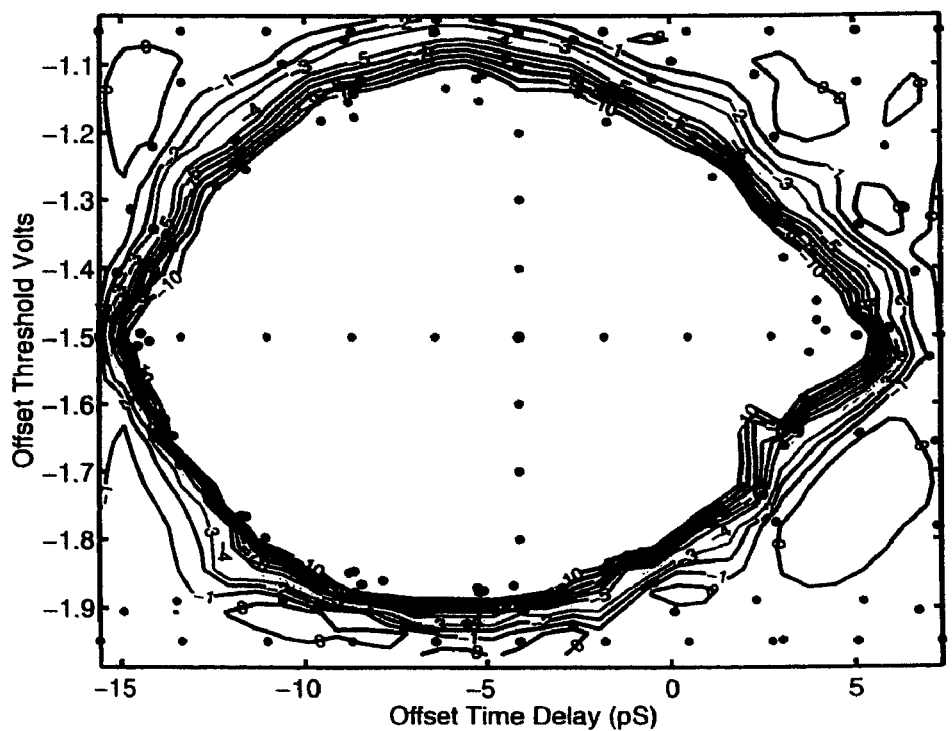

FIG. 15E illustrates the resulting BER map utilizing 154 points. Note the high accuracy of the low BER curves. The method spreads more measurements at areas of importance to the user than the raster method, without excessive measurements at uninteresting locations. Note also that the measurement points are around the relevant BER contours, rather than being clustered around one location.

The above-described methods are intended to be exemplary only, and it should be recognized that other methods could be used to spread points out around an Eye Diagram so as to efficiently construct the diagram using a limited number of points.

It should also be recognized that in other embodiments of the present invention, an Eye Diagram can be represented by other than a contour plot. For example, an Eye Diagram can be represented by a three-dimensional surface plot in which the BER is represented along the z-axis. Alternatively, a three-dimensional color mapped surface plot or a three-dimensional shaded surface plot can also be constructed using the present invention.

It should also be recognized that the various measurements can be made and stored digitally. Accordingly, the V-Curve, Bathtub Curve and Eye Diagrams need not be generated within the firmware of the measurement instrument itself, but can be generated by some external application software. This improves the display and accessibility of the measurement data, and also permits sophisticated algorithms to be used to generate the measurement data.

According to an embodiment of the present invention, an external software such as "Matlab" external software or an equivalent piece of numerical software, is used to permit a variety of sophisticated algorithms to provide the measurement points. Such sophisticated software tools makes it relatively easy to choose locations for measurements based on some optimized combination of the three above factors and/or on other factors.

When additional measurement points are selected as a function of measurement time required to measure the BER at particular offset voltage values and/or offset time values, a user can use calculations similar to those used in Table 1 to compute how long the BERT should wait for a given measurement of BER in order to obtain an accurate measurement. If the bit rate is in bits per second and the error rate is in errors per bit, the bit rate will be in units of errors per second. Thus, the time needed to measure k errors can be calculated as:

$$t_{meas} \text{ (sec)} = \left( \frac{k \text{ errors}}{(\text{Bit Rate}) \times (\text{Error Rate})} \right) \times \left( \frac{(\text{errors})}{(\text{errors/sec})} \right) \quad (5)$$

For an additional measurement point, the bit rate is known and the error rate is unknown. However, this can be estimated from previous measurements directly or by interpolating off of the estimated BER surface using the diagram. Note that $t_{meas}$ derived in this way is a statistical number and the user may pad it somewhat if desired to ensure that the appropriate number of errors has been measured. Also, to be practical, the algorithm would have to add overhead times such as communication overhead between processors settling time of the system at each new measurement point, etc.

An alternative, known, method involves actually counting the errors at a given measurement point until they exceed some threshold. To be efficient, however, such a method requires a close coupling between the error analysis algorithm and the test hardware which is not required in the above method which is based solely upon statistical assumptions.

Figure 16:
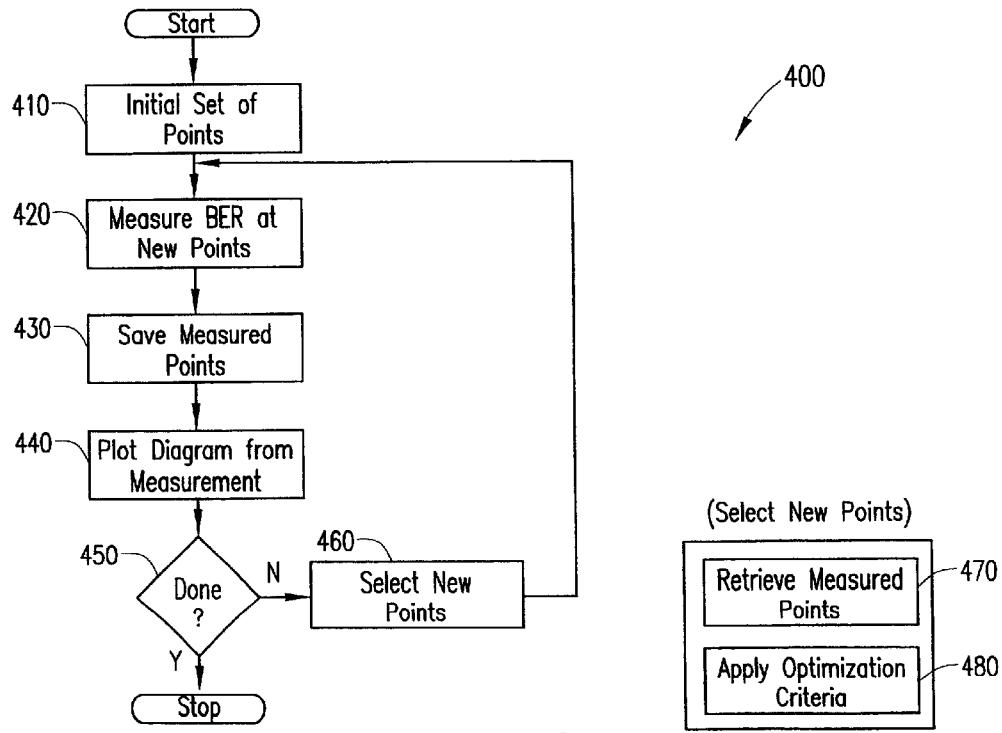
FIG. 16 is a flow chart that illustrates steps of a method for constructing a diagram representing the relationship between variable quantities according to an embodiment of the present invention.

FIG. 16 is a flow chart that illustrates steps of a method, generally designated by reference number 400, for constructing diagrams, such as V Curve diagrams, Bathtub Curve diagrams and Eye Diagrams, representing the relationship between variable quantities according to an embodiment of the present invention. Initially, a first plurality of measurement points representing the relationship between the variable quantities is provided as shown in step 410. As described above, the first plurality of measurement points can be provided by selecting points based on one or more criterion such as selecting points that are widely separated or selecting points on both positive and negative sides of a graph. The measured relationship between the variable quantities at the initial points are then stored.

The locations at which the relationship between the variable quantities is to be measured is then selected, and the relationship between the variable quantities at the locations is then measured as shown in step 420 to provide additional measurement points. As illustrated at 470 and 480, the selecting step includes retrieving the previously measured points from memory and applying optimization criteria in selecting the locations as described previously. The additional measurement points are then stored in step 430 and a diagram is plotted from the measurements so far made (step 440).

If the diagram is sufficiently accurate to satisfy the needs of a user (Y output of step 450), the method is completed. If the diagram is not sufficiently accurate (N output of step 450), steps 420–450 are repeated by selecting additional locations at which measurements are to be made, step 460, and then measuring the relationship between the variable quantities at the additional locations to provide additional measurement points until a diagram that satisfies the needs of the user has been constructed. With the present invention, a user can construct a diagram that is as accurate as required.

While what has been described constitute exemplary embodiments of the invention, it should be recognized that the invention can be varied in numerous ways without departing from the scope thereof Because the invention can be varied in numerous ways, it should be recognized that the invention should be limited only insofar as is required by the scope of the following claims.

I claim:

1. A method for constructing a diagram representing a relationship between variable quantities, comprising:
providing at least one first measurement point at which a relationship between variable quantities is measured for initially constructing the diagram;
selecting at least one location at which the relationship between the variable quantities is to be measured, the at least one location being selected as a function of the at least one first measurement point; and
measuring the relationship between said variable quantities at said at least one location to provide at least one additional measurement point for further constructing said diagram.

2. The method according to claim 1, wherein said function comprises a function of a position of said at least one first measurement point.

3. The method according to claim 2, wherein said function further comprises a function of a time required to perform a measurement at said at least one location.

4. The method according to claim 2, wherein said function further comprises a function of a specified total time for constructing a diagram.

5. The method according to claim 2, wherein said function further comprises a function of a value of at least one of said variable quantities.

6. The method according to claim 2, wherein said function comprises an optimization function.

7. The method according to claim 6, wherein said optimization function comprises maximizing a distance between additional measurement points and previously measured measurement points.

8. The method according to claim 6, wherein said optimization criterion comprises minimizing a number of measurements at low bit error rate values.

9. The method according to claim 6, wherein said diagram comprises an Eye Diagram, and wherein said optimization criterion comprises selecting a function of a contour of constant bit error rate.

10. The method according to claim 9, wherein the function of the contour comprises a filtered version of contour vertices.

11. The method according to claim 9, wherein the function of the contour comprises a smoothed version of contour vertices.

12. The method according to claim 9, wherein the function of the contour comprises a fit of a numerical function to contour vertices.

13. The method according to claim 12, wherein the numerical function fit comprises a conic section.

14. The method according to claim 13, wherein said conic section comprises an ellipse.

15. The method according to claim 14, wherein said ellipse is checked against limits to test validity of the ellipse.

16. The method according to claim 15, wherein measurement points are generated using a function of a sampled contour if said ellipse is not valid.

17. The method according to claim 9, wherein said function of a contour of constant bit error rate is selected to be one of a plurality of functions depending on a best fit of data.

18. The method according to claim 2, wherein said variable quantities include a control variable quantity that can be set to selected values, and an output variable quantity, values of which are dependent on the selected values at which the control variable quantity is set, and wherein said selecting step comprises selecting said at least one location as a function of a value of the control variable quantity at said at least one first measurement point.

19. The method according to claim 18, wherein said selecting step comprises selecting said at least one location to satisfy an optimization criterion of a function of a value of the control variable quantity at said at least one first measurement point.

20. The method according to claim 2, wherein said variable quantities include a control variable quantity that can be set to selected values, and an output variable quantity, values of which are dependent on the selected values at which the control variable quantity is set, and wherein said selecting step comprises selecting said at least one location as a function of values of both said control variable quantity and said output variable quantity at said at least one first measurement point.

21. The method according to claim 20, wherein said selecting step comprises selecting said at least one location to satisfy an optimization criterion of a function of values of both said control variable quantity and said output variable quantity at said at least one first measurement point.

22. The method according to claim 1, and further including the step of repeating said selecting and measuring steps, wherein each repeated selecting step selects at least one location as a function of all previously provided measurement points.

23. The method according to claim 1, wherein said variable quantities comprise a threshold voltage value and a bit error rate of a digital signal, and wherein said diagram comprises a V Curve diagram.

24. The method according to claim 1, wherein said variable quantities comprise an offset time value and a bit error rate of a digital signal, and wherein said diagram comprises a Bathtub Curve diagram.

25. The method according to claim 1, wherein said variable quantities comprise a threshold voltage value, an offset time value and a bit error rate of a digital signal, and wherein said diagram comprises an Eye Diagram.

26. The method according to claim 25, wherein said function comprises an estimated bit error rate surface of said Eye Diagram.

27. The method according to claim 25, wherein said function comprises a function of an estimated bit error rate surface of said Eye Diagram.

28. The method according to claim 27, wherein said function of said estimated bit error rate surface of said Eye Diagram comprises a logarithmic function of said estimated bit error rate surface of said Eye Diagram.

29. The method according to claim 25, wherein said function comprises a function of a scaled version of an estimated bit error rate surface of said Eye Diagram.

30. The method according to claim 29, wherein said function of said estimated bit error rate surface comprises a logarithmic function of a scaled version of said estimated bit error rate surface of said Eye Diagram.

31. The method according to claim 1, wherein said selecting step comprises selecting said at least one location to satisfy an optimization criterion of a function of the at least one first measurement point.

32. The method according to claim 1, wherein said selecting step comprises selecting said at least one location as a function of an estimate of a bit error rate surface used to compute measurement times for said at least one location.

33. The method according to claim 1, wherein said selecting step is performed by an external application software.

34. A method for constructing a diagram representing a relationship between variable quantities, comprising:

providing at least one first measurement point at which a relationship between variable quantities is measured for initially constructing the diagram;

selecting at least one location at which the relationship between the variable quantities is to be measured, the at least one location being selected as a function of the at least one first measurement point;

measuring the relationship between said variable quantities at said at least one location to provide at least one additional measurement point for further constructing said diagram; and repeating said selecting and measuring steps until said constructed diagram is satisfactory to a user, wherein each repeated selecting step selects at least one location as a function of all previously provided measurement points.

35. The method according to claim 34, wherein said diagram comprises one of a V Curve diagram, a Bathtub Curve diagram and an Eye Diagram.

36. The method according to claim 34, wherein said diagram comprises an Eye Diagram, and wherein said function comprises a function of a bit error rate surface of said Eye Diagram.

37. The method according to claim 34, wherein said function comprises at least one of a function of a position of said at least one first measurement point, a function of time required to perform a measurement at least one location, and a value of at least one of said variable quantities.

38. Apparatus for constructing a diagram representing a relationship between variable quantities, comprising:

a selector for selecting at least one location at which the relationship between said variable quantities is to be measured, the at least one location being selected as a function of all previously provided measurement points for constructing the diagram; and a tester for measuring the relationship between said variable quantities at each of said at least one location to provide at least one additional measurement point for further constructing said diagram.

39. The apparatus according to claim 38, wherein said selector comprises an external application hardware.

40. The apparatus according to claim 39, wherein said external application hardware comprises a Matlab external application hardware.

41. The apparatus according to claim 38, wherein one of said variable quantities comprises a bit error rate of a digital signal, and wherein said tester comprises a bit error rate tester.

* * * * *